United States Patent
Yamamoto

(10) Patent No.: US 9,992,425 B2
(45) Date of Patent: Jun. 5, 2018

(54) IMAGE PICKUP SYSTEM THAT PERFORMS LIGHT EMISSION CONTROL, LIGHT EMISSION DEVICE, LIGHT EMISSION CONTROL METHOD, AND STORAGE MEDIUM

(71) Applicant: CANON KABUSHIKI KAISHA, Tokyo (JP)

(72) Inventor: Yutaka Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/475,569

(22) Filed: Mar. 31, 2017

(65) Prior Publication Data
US 2017/0289423 A1 Oct. 5, 2017

(30) Foreign Application Priority Data
Apr. 4, 2016 (JP) .................. 2016-075087

(51) Int. Cl.
- H04N 5/235 (2006.01)
- H04N 5/225 (2006.01)
- G01C 3/08 (2006.01)
- F21K 5/16 (2006.01)

(52) U.S. Cl.
CPC ............. *H04N 5/2354* (2013.01); *G01C 3/08* (2013.01); *G03B 15/0473* (2013.01); *H04N 5/2256* (2013.01)

(58) Field of Classification Search
CPC ...... H04N 5/2354; H04N 5/2256; G01C 3/08; G03B 15/0473; G03B 15/06; G03B 2215/051; G03B 2215/0528
See application file for complete search history.

(56) References Cited

U.S. PATENT DOCUMENTS

| | | | | |
|---|---|---|---|---|
| 5,111,232 A | * | 5/1992 | Tsunefuji | G03B 7/16 396/234 |
| 5,515,133 A | * | 5/1996 | Taniguchi | G03B 7/28 396/155 |
| 6,067,422 A | * | 5/2000 | Tokunaga | G03B 7/16 396/157 |
| 2015/0036042 A1 | * | 2/2015 | Umehara | G03B 15/05 348/371 |
| 2015/0156389 A1 | * | 6/2015 | Umehara | G03B 15/05 348/242 |
| 2016/0072995 A1 | * | 3/2016 | Kojima | G03B 15/05 348/371 |
| 2017/0351160 A1 | * | 12/2017 | Ichihara | G03B 7/16 |

FOREIGN PATENT DOCUMENTS

JP 2015-004933 A 1/2015

* cited by examiner

*Primary Examiner* — Shahbaz Nazrul
(74) *Attorney, Agent, or Firm* — Cowan, Liebowitz & Latman, P.C.

(57) ABSTRACT

A technique for strobe shooting using automatic irradiation direction control. A strobe device includes a light emission section that emits light, and a drive unit that changes an irradiation direction of light emitted from the light emission section. Exposure conditions set to the camera are notified to the strobe device, and light emission conditions are set according to the exposure conditions. The irradiation direction of light emitted from the light emission section is determined based on the exposure conditions and the light emission conditions.

12 Claims, 12 Drawing Sheets

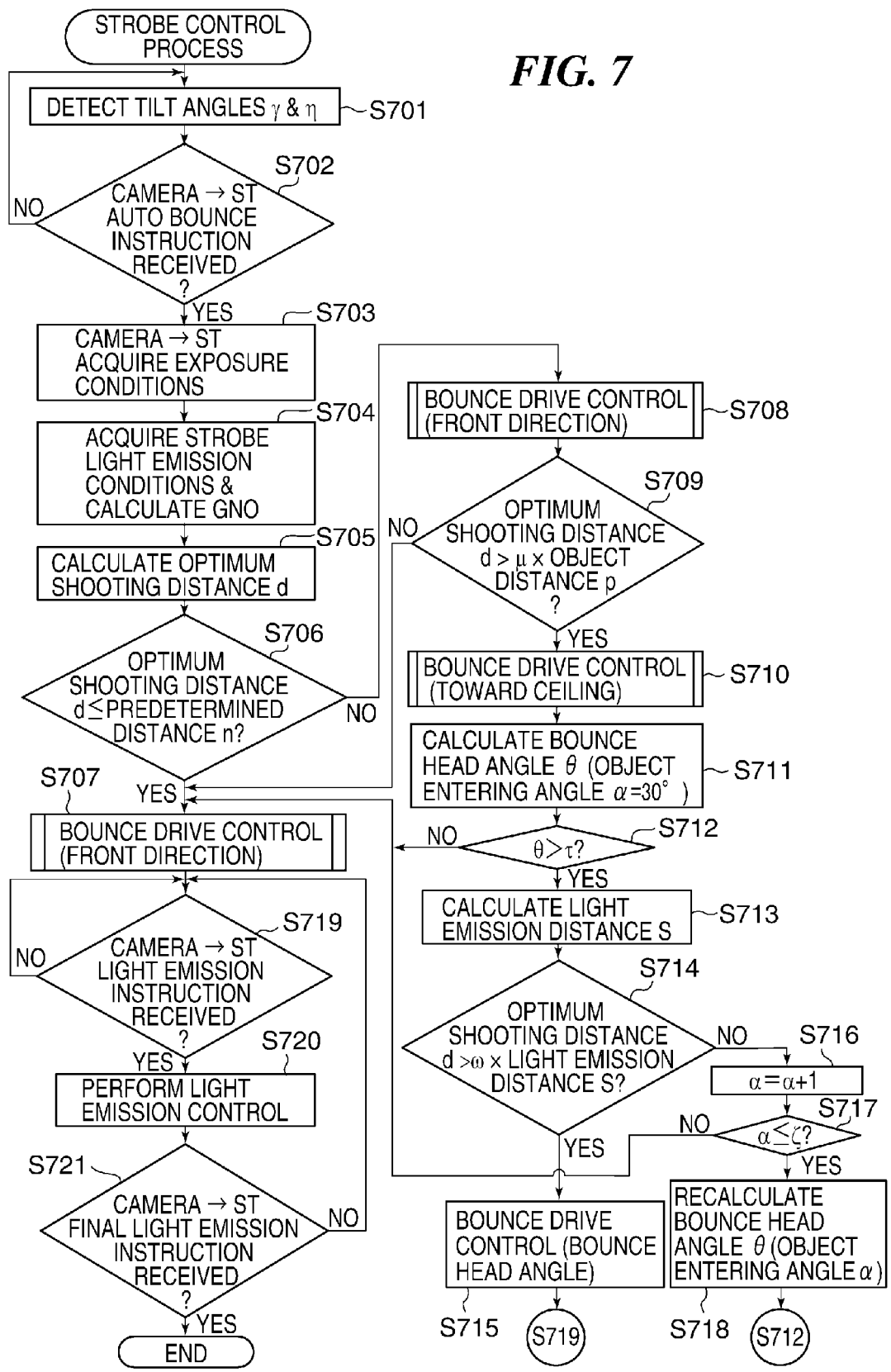

FIG. 8A1
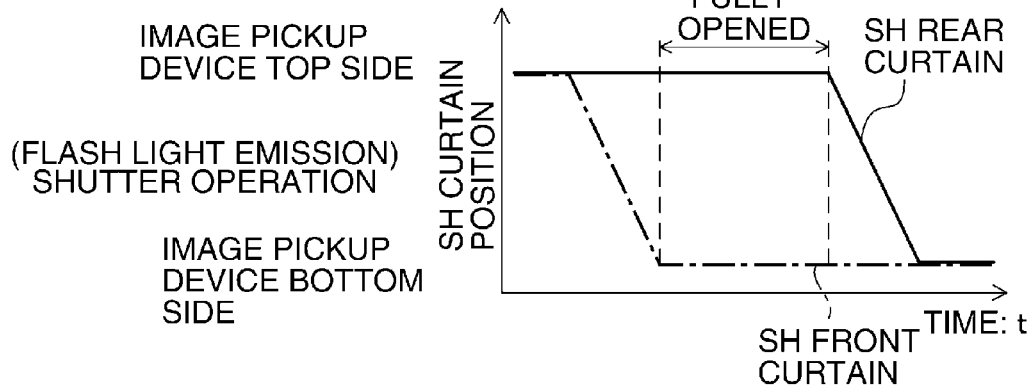
FIG. 8A2
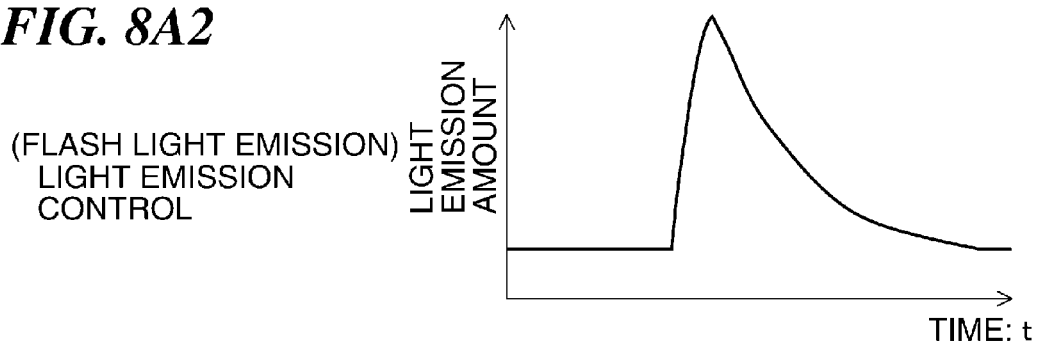
FIG. 8B1
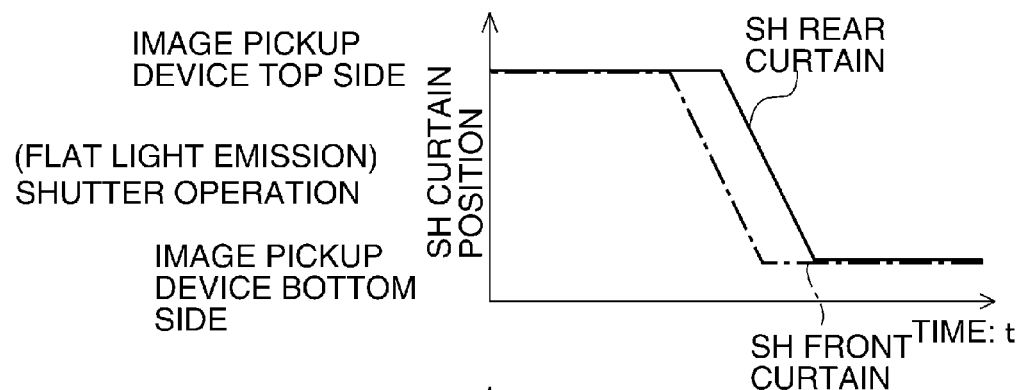
FIG. 8B2
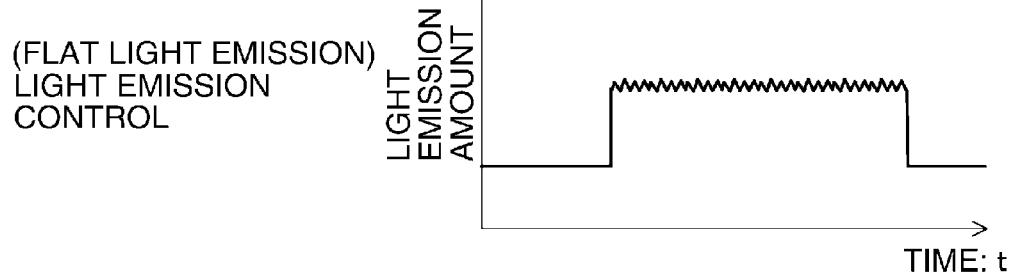

IMAGE PICKUP SYSTEM THAT PERFORMS LIGHT EMISSION CONTROL, LIGHT EMISSION DEVICE, LIGHT EMISSION CONTROL METHOD, AND STORAGE MEDIUM

BACKGROUND OF THE INVENTION

Field of the Invention

The present invention relates to a light emission control technique for a light emission device that is incorporated in or removably attached to an image pickup apparatus, such as a digital camera.

Description of the Related Art

Examples of an image pickup apparatus, such as a digital camera, include one that is capable of performing so-called bounce shooting in which a strobe light is emitted toward a ceiling, and an object is illuminated by diffusely reflected light from the ceiling etc. Bounce shooting makes it possible to indirectly illuminate an object, and hence the object can be rendered in soft light.

Further, examples of a strobe device that performs bounce shooting include one configured to perform e.g. preliminary light emission or laser irradiation to measure respective reflected lights from an object and the ceiling by a light receiving sensor of the strobe device. In the strobe device of this type, automatic irradiation direction control (automatic bounce drive control) is performed, in which an optimum angle of a strobe head part is determined based on the measured values obtained from the light receiving sensor so as to make it possible to render the object in soft light, and the strobe head part is driven with the determined angle. This makes it possible to perform optimum bounce shooting without requiring a photographer to set the angle of the strobe head part by himself/herself.

Conventionally, there has been proposed a camera that acquires a distance to an object which is in front of the camera, and a distance to a ceiling or the like which is located upward of the camera, and automatically sets an angle of the strobe head part when performing strobe light emission toward the ceiling for bounce shooting based on the acquired results (Japanese Laid-Open Patent Publication (Kokai) No. 2015-4933).

In Japanese Laid-Open Patent Publication (Kokai) No. 2015-4933, an angle of the strobe head part for bounce shooting is automatically set based on a distance to an object and a distance to a ceiling, but a condition in which a light amount of strobe light emission becomes insufficient is not considered.

For example, in high-speed synchronization shooting or the like, the shutter speed is high, and the amount of strobe light taken in to form a shot image is sometimes small. Further, in synchro-flash shooting, a photographed field is bright by flash light emission, and the amount of strobe light irradiated onto an object for shooting is sometimes relatively reduced.

In such a shooting condition, when an angle of the strobe head part for bounce shooting is automatically set based on a distance to an object and a distance to a ceiling, the light amount of strobe light emission becomes insufficient, which makes it impossible to perform optimum bounce shooting.

Further, in bounce shooting, even under a shooting condition in which the light amount of strobe light emission becomes obviously insufficient, when the automatic bounce drive control is started, the operation for measuring a distance to an object and a distance to a ceiling is performed. As a result, the unnecessary operation may prevent the shooting operation from being performed at a desired timing, and may cause wasteful consumption of electric power.

SUMMARY OF THE INVENTION

The present invention provides a technique for strobe shooting using automatic irradiation direction control, which makes it possible to perform optimum strobe shooting by preventing the amount of light emitted from a light emission device from becoming insufficient, and an operation of the automatic irradiation direction control from being unnecessarily performed.

In a first aspect of the invention, there is provided an image pickup system including an image pickup apparatus, and a light emission device that is incorporated or removably mounted on the image pickup apparatus and is capable of communicating with the image pickup apparatus, the light emission device including a light emission section that emits light, and a drive unit configured to change an irradiation direction of light emitted from the light emission section, the image pickup system comprising an exposure condition-setting unit configured to set exposure conditions which are set to the image pickup apparatus, a determination unit configured to determine the irradiation direction of light emitted from the light emission section which is to be changed by the drive unit, and a light emission condition-setting unit configured to set light emission conditions which are set to the light emission device according to the exposure conditions, wherein the determination unit determines the irradiation direction of light emitted from the light emission section, based on the exposure conditions set by the exposure condition-setting unit, and the light emission conditions set by the light emission condition-setting unit.

In a second aspect of the invention, there is provided an image pickup system including an image pickup apparatus, and a light emission device that is incorporated or removably mounted on the image pickup apparatus, and is capable of communicating with the image pickup apparatus, the light emission device including a light emission section that emits light, and a drive unit configured to change an irradiation direction of light emitted from the light emission section, the image pickup system comprising a determination unit configured to determine the irradiation direction of light emitted from the light emission section which is to be changed by the drive unit, and a light emission condition-setting unit configured to set flash light emission or flat light emission as a light emission condition of the light emission device, according to selection by a user operation the image pickup apparatus, wherein the determination unit determines the irradiation direction of light emitted from the light emission section based on the light emission condition set by the light emission condition-setting unit.

In a third aspect of the invention, there is provided a light emission device including a light emission section that emits light, and a drive unit configured to change an irradiation direction of light emitted from the light emission section, the light emission device being incorporated or removably mounted on an image pickup apparatus and being capable of communicating with the image pickup apparatus, the light emission device comprising an acquisition unit configured to acquire exposure conditions set by the image pickup apparatus, a determination unit configured to determine the irradiation direction of light emitted from the light emission section which is to be changed by the drive unit, and a light emission condition-setting unit configured to set light emission conditions according to the exposure conditions, wherein the determination unit determines the irradiation direction of light emitted from the light emission section, based on the exposure conditions acquired by the acquisition unit and the light emission conditions set by the light emission condition-setting unit.

In a fourth aspect of the invention, there is provided a light emission control method for a light emission device that includes a light emission section that emits light, and a drive unit configured to change an irradiation direction of light emitted from the light emission section, and is incorporated or removably mounted on an image pickup apparatus and capable of communicating with the image pickup apparatus, the method comprising acquiring exposure conditions set by the image pickup apparatus, determining the irradiation direction of light emitted from the light emission section which is to be changed by the drive unit, and setting light emission conditions according to the exposure conditions, wherein said determining includes determining the irradiation direction of light emitted from the light emission section based on the exposure conditions acquired by said acquiring and the light emission conditions set by said setting.

In a fifth aspect of the invention, there is provided a non-transitory computer-readable storage medium storing a computer-executable program for executing a light emission control method for a light emission device that includes a light emission section that emits light, and a drive unit configured to change an irradiation direction of light emitted from the light emission section, and is incorporated or removably mounted on an image pickup apparatus and capable of communicating with the image pickup apparatus, wherein the method comprises acquiring exposure conditions set by the image pickup apparatus, determining the irradiation direction of light emitted from the light emission section which is to be changed by the drive unit, and setting light emission conditions according to the exposure conditions, wherein said determining includes determining the irradiation direction of light emitted from the light emission section based on the exposure conditions acquired by said acquiring and the light emission conditions set by said setting.

According to the present invention, in strobe shooting using the automatic irradiation direction control, it is possible to perform optimum strobe shooting by preventing the amount of light emitted from the light emission device from becoming insufficient, and an operation of the automatic irradiation direction control from being unnecessarily performed.

Further features of the present invention will become apparent from the following description of exemplary embodiments (with reference to the attached drawings).

BRIEF DESCRIPTION OF THE DRAWINGS

FIG. 7 is a flowchart of a strobe control process for controlling the strobe operation of the strobe device.

FIGS. 8A1 to 8B2 are graphs useful in explaining a GNo value changed according to a light emission mode and a zoom position, which are light emission conditions of the strobe device.

DESCRIPTION OF THE EMBODIMENTS

The present invention will now be described in detail below with reference to the accompanying drawings showing embodiments thereof.

Figure 1A:
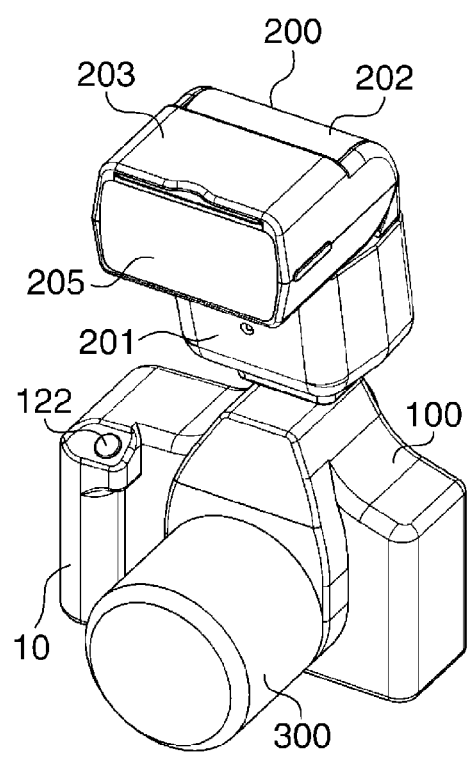
FIG. 1A is a perspective view of a digital camera and an external strobe device attached to a camera body of the digital camera, which form an image pickup system according to a first embodiment of the present invention, as viewed from the front (from an object side).
Figure 1B:
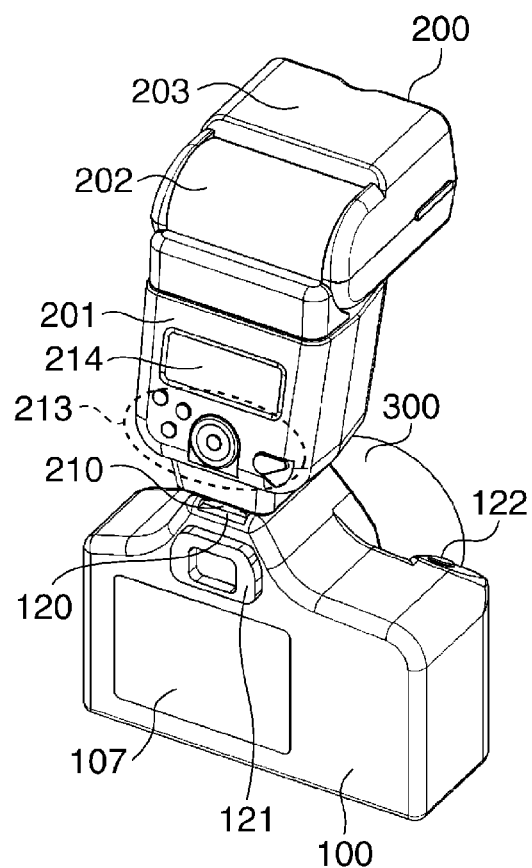
FIG. 1B is a perspective view of FIG. 1A, as viewed from the rear.

FIG. 1A is a perspective view of a digital camera and an external strobe device attached to a camera body of the digital camera, which form an image pickup system according to a first embodiment of the present invention, as viewed from the front (from an object side). FIG. 1B is a perspective view of FIG. 1A, as viewed from the rear. Although in the present embodiment, the digital camera is described as the image pickup apparatus, by way of example, this is not limitative.

As shown in FIGS. 1A and 1B, the image pickup system according to the present embodiment includes the digital camera, denoted by reference numeral 10, and the strobe device of externally attached type, denoted by reference numeral 200, which is attached to the camera body, denoted by reference numeral 100, of the digital camera 10.

An interchangeable lens 300 is removably mounted on a front side of the camera body 100 of the digital camera 10, and a top of the camera body 100 is provided with a release button 122 and an external strobe connection section (accessory shoe) 120, and further, operation dials and the like, not shown, for various operations. In the top of the camera body 100, a pop-up type built-in strobe device 119 (see FIG. 2) is accommodated. A rear of the camera body 100 is provided with an image display section 107, such as an LCD, a viewfinder eyepiece 121, and so forth.

The strobe device 200 includes a strobe body 201 that is removably attached to the external strobe connection section 120 of the camera body 100 via a camera connection section 210. A strobe head part 203 having a light emission section 205 is supported on the strobe body 201 via a bounce mechanism section 202 in such a manner that its angle is adjustable. A rear of the strobe body 201 is provided with a display section 214, various operation members 213, and so forth.

Figure 2:
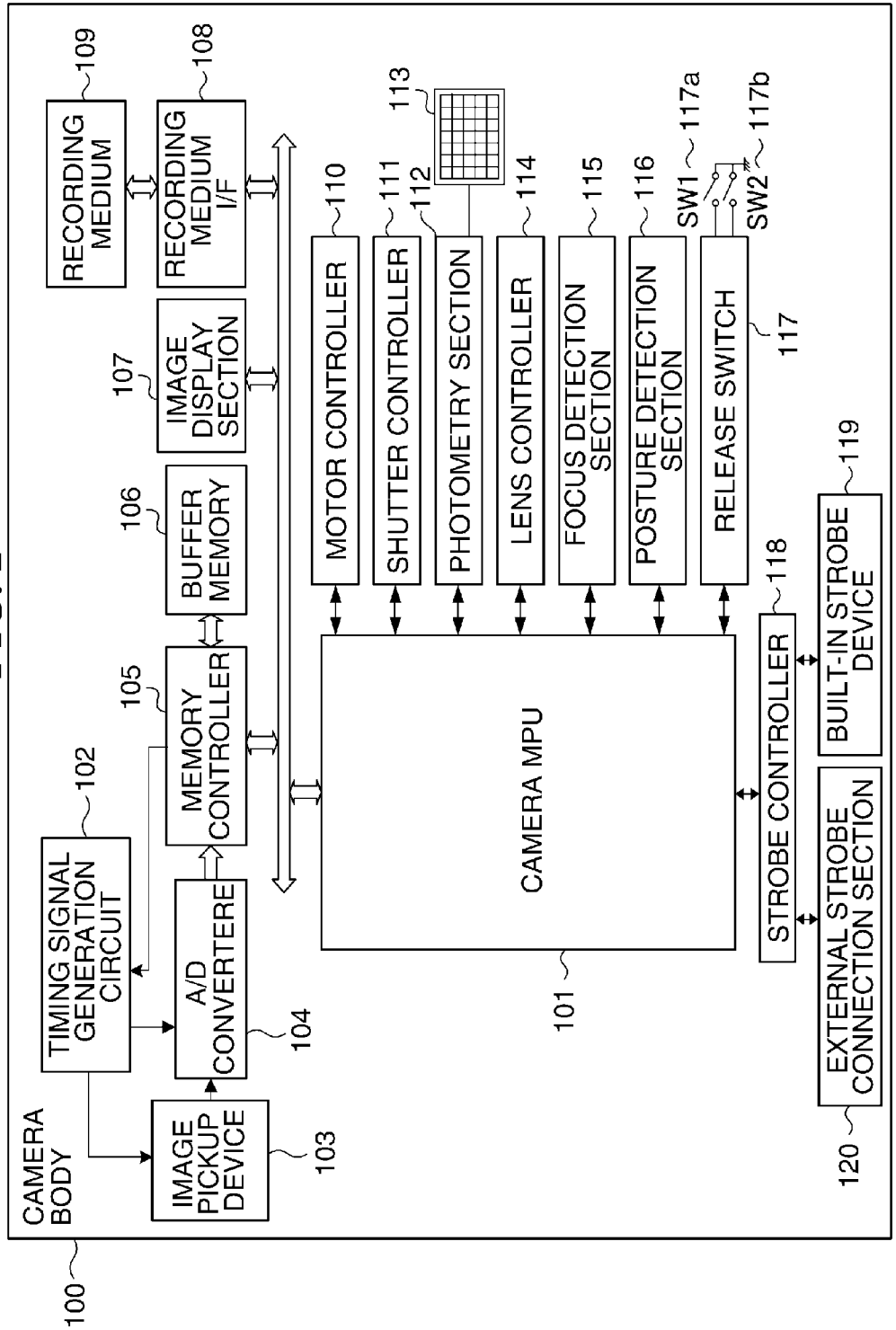
FIG. 2 is a block diagram of a control system of the camera body.

FIG. 2 is a block diagram of a control system of the camera body 100. Referring to FIG. 2, a camera MPU 101 controls the overall operation of the camera, such as a shooting sequence. Further, the camera MPU 101 forms an exposure condition-setting unit configured to set exposure conditions based on settings of the exposure conditions (Tv value, Av value, and ISO sensitivity value) set by a photographer as desired, a shooting mode, and an exposure value of a field, obtained by a photometry section 112.

An image pickup device 103 that is implemented e.g. by a CCD sensor or a CMOS sensor photoelectrically converts an object image formed thereon via a shooting optical system of the interchangeable lens 300, and outputs the object image as analog image data to an analog-to-digital converter 104. A timing signal generation circuit 102 generates a timing signal necessary for driving the image pickup device 103.

The analog-to-digital converter 104 converts the analog image data output from the image pickup device 103 to digital image data. A memory controller 105 controls operations for reading data from and writing data into a memory, and a refresh operation of a buffer memory 106. The image display section 107 displays image data stored in the buffer memory 106. A recording medium interface 108 is an interface with a recording medium 109. The recording medium 109 is implemented e.g. by a memory card or a hard disk.

A motor controller 110 controls motors, not shown, according to signals delivered from the camera MPU 101 during an exposure operation, to thereby perform an operation for moving up/down a mirror, not shown, and a charging operation of a shutter, not shown. A shutter controller 111 causes power supply to a shutter front curtain and a shutter rear curtain, neither of which is shown, to be stopped for curtain travel operation according to a signal delivered from the camera MPU 101, to thereby control the exposure operation.

The photometry section 112 delivers outputs from a photometry sensor 113, which are associated with a plurality of areas into which a screen is divided, as respective luminance signals of the areas, to the camera MPU 101. The camera MPU 101 converts the luminance signals to digital signals by an analog-to-digital converter, not shown, and calculates a shutter control value (Tv value), an aperture control value (Av value), a gain setting value (ISO sensitivity value), and so forth, which are used for exposure adjustment in shooting. Further, the photometry section 112 delivers luminance signals obtained when preliminary light emission toward an object has been performed by the built-in strobe device 119 or the strobe device 200, to the camera MPU 101, and the camera MPU 101 also calculates a light amount of main light emission for exposure.

A lens controller 114 performs communication between the interchangeable lens 300 and the camera body 100 via a lens mount contact, not shown, causes a lens drive motor and a lens diaphragm motor, neither of which is shown, to operate to thereby perform focus adjustment and aperture control of the lens. A focus detection section 115 detects a defocus amount with respect to an object for AF (auto focus) using e.g. a phase difference detection method.

A posture detection section 116 detects a tilt of the camera 10 in a direction of rotation about an optical axis. A release switch (SW1) 117*a* is turned on by a first stroke of the release button 122, and instructs the camera MPU 101 to start AF and photometry. A release switch (SW2) 117*b* is turned on by a second stroke of the release button 122, and instructs the camera MPU 101 to start the exposure operation. A release switch 117 appearing in FIG. 2 is formed by the release switch (SW1) 117*a* and the release switch (SW2) 117*b*.

A strobe controller 118 performs light emission processing including processing for selecting a light emission mode (flash light emission or flat light emission), and processing for instructing a light emission pattern (preliminary light emission or main light emission), and provides an automatic bounce driving instruction, etc. The camera MPU 101 communicates with the built-in strobe device 119 via the strobe controller 118, and communicates with the strobe device 200 via the strobe controller 118 and the external strobe connection section 120.

Figure 3:
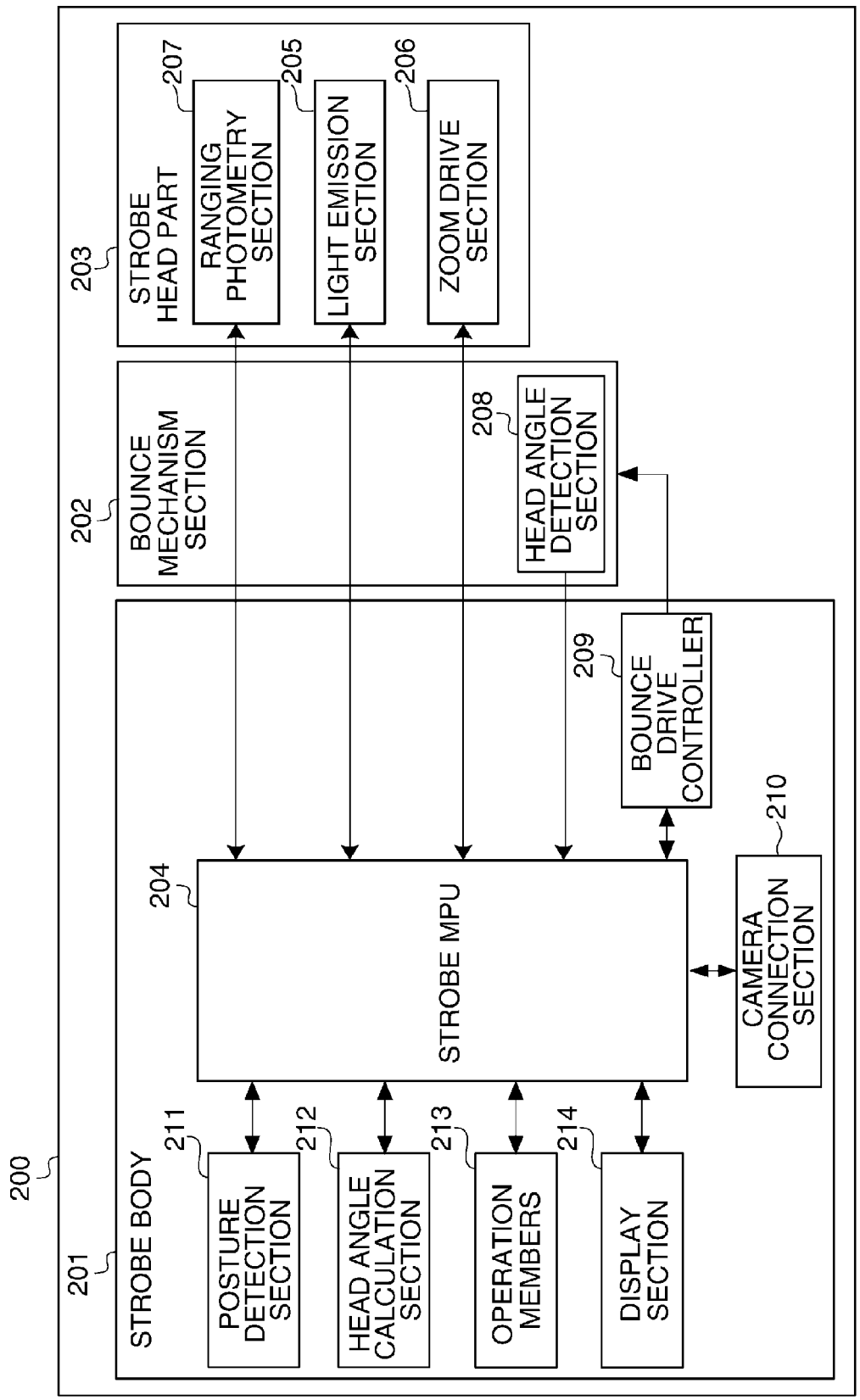
FIG. 3 is a block diagram of a control system of the strobe device.
Figure 4A:
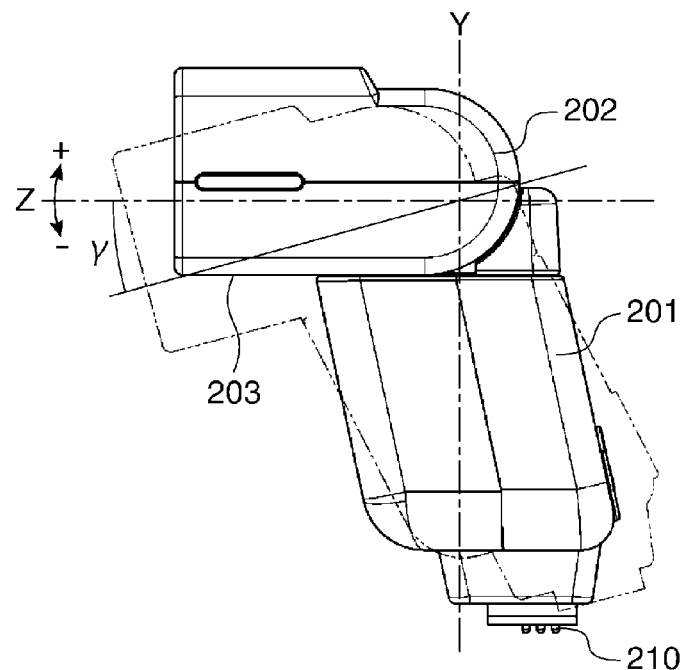
FIGS. 4A and 4B are diagrams useful in explaining an angle of tilt of a strobe body in a pitch direction and a roll direction.
Figure 4B:
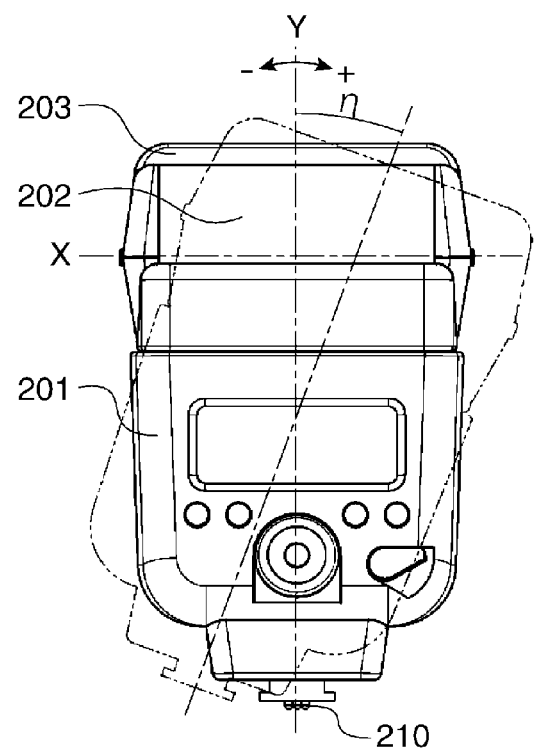
Figure 5A:
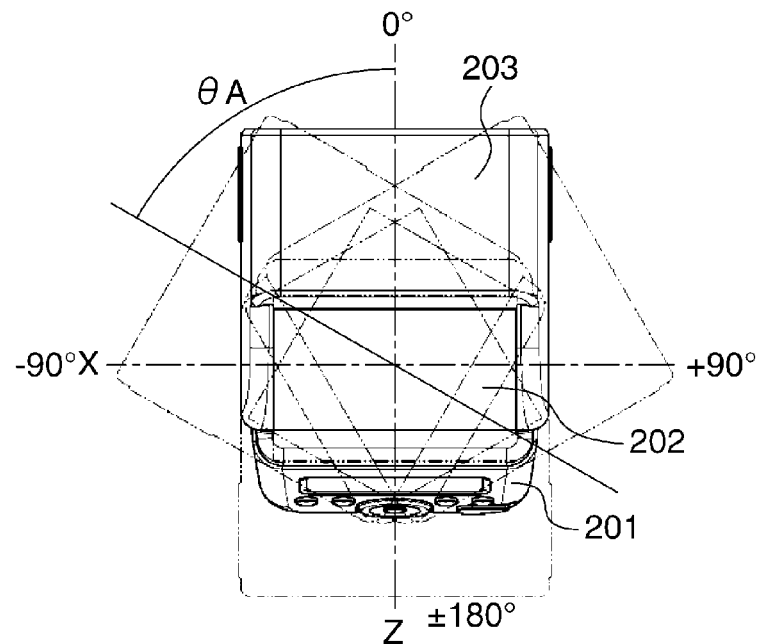
FIGS. 5A to 5C are diagrams useful in explaining an angle of rotation of a strobe head part in a horizontal direction and a vertical direction.
Figure 5B:
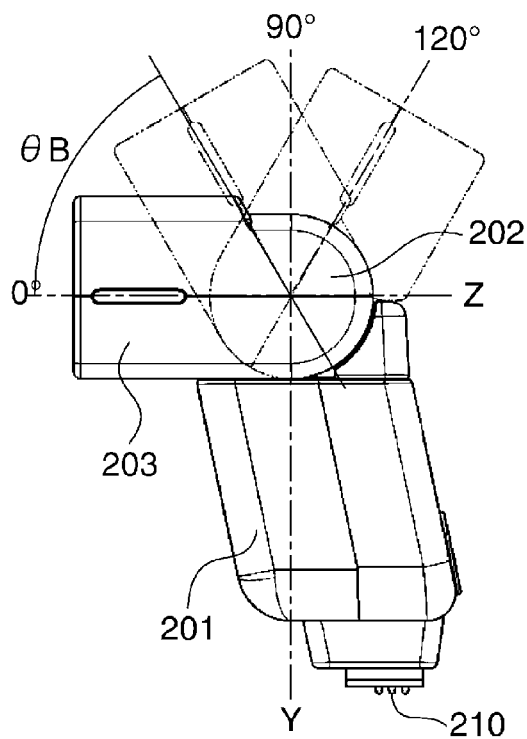
Figure 5C:
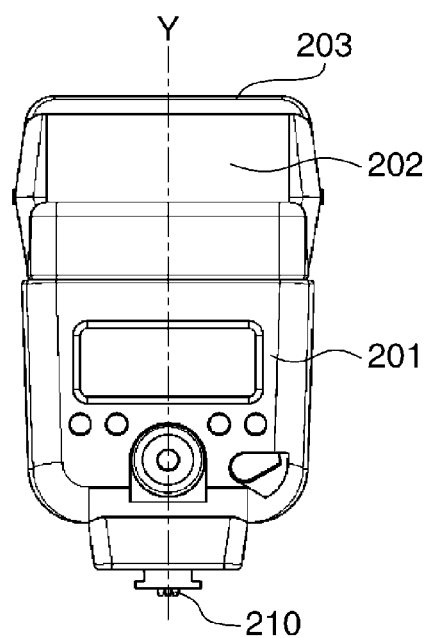

Next, a description will be given of the strobe device 200 with reference to FIGS. 3 to 5C. FIG. 3 is a block diagram of a control system of the strobe device 200. FIGS. 4A and 4B are diagrams useful in explaining a tilt angle γ of the strobe body 201 in a pitch direction and a tilt angle η of the same in a roll direction. FIGS. 5A to 5C are diagrams useful in explaining an angle of rotation of the strobe head part 203 in a horizontal direction and a vertical direction.

As shown in FIG. 3, the strobe body 201 includes a strobe MPU 204, a posture detection section 211, a head angle calculation section 212, the operation members 213, the display section 214, a bounce drive controller 209, and the camera connection section 210.

The strobe MPU 204 controls the overall operation of the strobe device 200, and performs selection and control of the light emission mode, such as flash light emission or flat light emission, control of an amount of light emission, control of intensity and duration of light emission in flat light emission, etc. Further, the strobe MPU 204 performs system control including control of an irradiation angle of emitted light, and determination of an angle of the strobe head part 203 in automatic bounce drive control.

Further, the strobe MPU 204 forms a light emission condition-setting unit configured to set the light emission mode, such as flash light emission or flat light emission, and the light emission conditions, such as a zoom position, which are to be set to a zoom drive section 206 of the strobe head part 203. Further, the strobe MPU 204 forms an optimum shooting distance calculation unit configured to calculate an optimum shooting distance based on the exposure conditions acquired from the camera body 100 and the light emission conditions. Further, the strobe MPU 204 forms a light emission distance calculation unit configured to calculate a light emission distance based on a distance to a ceiling and a distance to an object which are measured by a ranging photometry section 207 of the strobe head part 203.

The bounce drive controller 209 controls a motor, not shown, according to a signal delivered from the strobe MPU 204 to thereby drive the strobe head part 203 with respect to the strobe body 201 in the horizontal direction and the vertical direction. The camera connection section 210 performs communication with the camera body 100 via the external strobe connection section 120 of the camera body 100.

As shown in FIGS. 4A and 4B, the posture detection section 211 acquires the tilt angle γ of the strobe body 201 in the pitch direction and the tilt angle η of the same in the roll direction using a horizontal position (normal position) of the camera 10 as a reference. The tilt angles γ and η are detected while representing rotation in a clockwise direction by a plus value and rotation in an anticlockwise direction by a minus value, as shown in FIGS. 4A and 4B.

In response to an instruction from the strobe MPU 204, the head angle calculation section 212 calculates an optimum angle of the strobe head part 203 for bounce shooting based on the data acquired by the ranging photometry section 207 and the data acquired by the posture detection section 211.

The bounce mechanism section 202 includes a head angle detection section 208, a main capacitor, not shown, and so forth, and holds the strobe head part 203 in a rotatable manner with respect to the strobe body 201 in the horizontal direction and the vertical direction, respectively. This makes it possible to perform bounce shooting while changing the direction of irradiation of strobe light emission.

The head angle detection section 208, which is comprised of a substrate having a phase pattern and a rotational angle sensor including a contact brush, detects a rotational angle of the strobe head part 203 relative to the strobe body 201 in bounce shooting, and outputs the detected angle to the strobe MPU 204. The head angle detection section 208 detects, as shown in FIGS. 5A to 5C, an angle of rotation of the strobe head part 203 about a Y axis with respect to the normal position (head angle of 0°) in which the strobe head part 203 faces the field, as a horizontal head angle θA. Further, the head angle detection section 208 detects an angle of rotation of the strobe head part 203 about an X axis with respect to the normal position (head angle of 0°) in which the strobe head part 203 faces the field, as a vertical head angle θB.

Here, in the present embodiment, as shown in FIGS. 5A to 5C, it is assumed that the horizontal head angle θA in a direction in which the strobe head part 203 is directed to the left as viewed from a photographer (from the rear of the camera body 100) is expressed by θA=−90°, and the horizontal head angle θA in a direction in which the strobe head part 203 is directed to the right as viewed from the photographer is expressed by θA=+900. Further, the horizontal head angle θA in a direction in which the strobe head part 203 is directed to the photographer is expressed by θA=±180° (expressed by θA=−180° when the strobe head part 203 has been rotated anticlockwise, and θA=+180° when the strobe head part 203 has been rotated clockwise). The vertical head angle θB in a direction in which the strobe head part 203 is directed vertically upward as viewed from the photographer is expressed by θB=+90°.

Then, in the present embodiment, a movable angle range within which the strobe head part 203 can be rotated with respect to the strobe body 201 via the bounce mechanism section 202 is assumed to be −180° to +180° for the horizontal head angle θA, and 0 to +120° for the vertical head angle θB.

The strobe head part 203 includes the ranging photometry section 207, the light emission section 205, and the zoom drive section 206.

The light emission section 205 includes a discharge tube, such as a xenon tube, a reflection umbrella, a Fresnel lens, and a strobe light emission circuit, none of which are shown, and the strobe light emission circuit causes the discharge tube to emit strobe light according to a light emission signal delivered from the strobe MPU 204. Note that an LED or the like may be used as a light source in place of the discharge tube.

The zoom drive section 206 is comprised of a drive motor, a lead screw, and so forth, none of which are shown. The zoom drive section 206 drives the xenon tube and the reflection umbrella of the light emission section 205 based on control signals delivered from the strobe MPU 204 to thereby change the illumination range of strobe light. This makes it possible to irradiate an object with strobe light adjusted to a focal length of the interchangeable lens 300 when shooting using the camera 10.

The ranging photometry section 207 receives strobe light which is emitted from the light emission section 205 and reflected by a ranging target using a ranging photometry sensor, not shown, and delivers an output to the strobe MPU 204 as a luminance signal. The strobe MPU 204 performs analog-to-digital conversion on the received luminance signal using an analog-to-digital converter, not shown, and calculates a distance corresponding to the converted amount. Note that the ranging photometry section 207 measures a distance to a ceiling and a distance to an object, in automatic bounce drive control.

Next, a description will be given of a shooting control process for controlling a shooting operation of the camera 10 with reference to FIG. 6. The shooting control process in FIG. 6 is performed by the camera MPU 101 that executes a program which is stored e.g. in a ROM of the camera body 100, not shown, and is loaded into a RAM, not shown.

Figure 6:
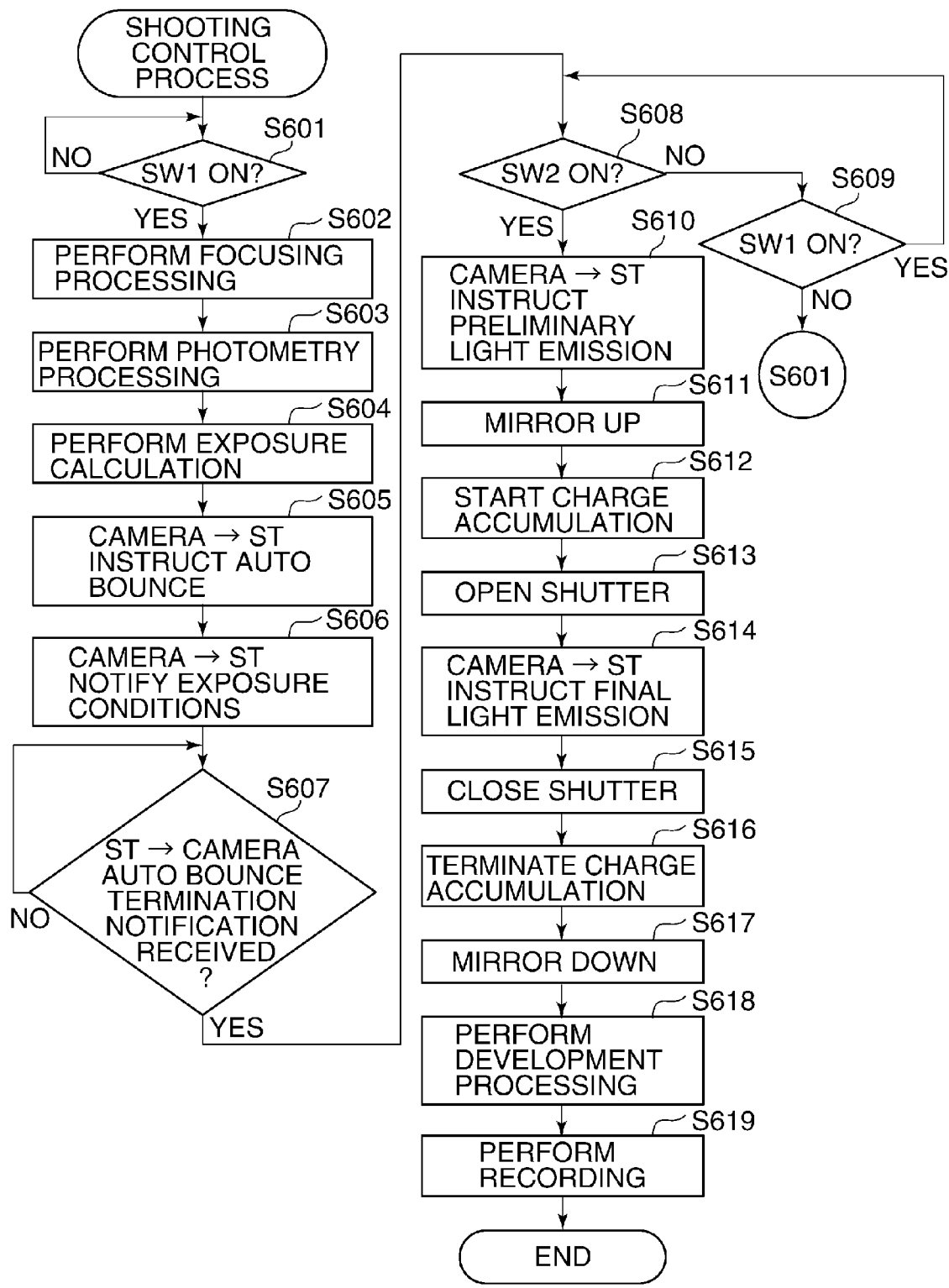
FIG. 6 is a flowchart of a shooting control process for controlling shooting performed by the digital camera.

Referring to FIG. 6, in a step S601, if the release switch (SW1) 117a is turned on, the camera MPU 101 proceeds to a step S602. In the step S602, after ranging is performed by the focus detection section 115, the camera MPU 101 causes the lens controller 114 to perform auto focus control for moving a focus lens of the interchangeable lens 300 to an in-focus position, and proceeds to a step S603.

In the step S603, the camera MPU 101 performs a photometry operation using the photometry section 112, and acquires a result of the photometry. For example, when the photometry sensor 113 of the photometry section 112 performs photometry in each of six divided areas, the camera MPU 101 stores a luminance value of each area acquired by the photometry, in the buffer memory 106, as an EVb(i) (i=0 to 5), and then proceeds to a step S604.

In the step S604, the camera MPU 101 performs exposure calculation using a known algorithm based on the photometry results acquired in the step S603, the set shooting mode, and so forth, to thereby set various exposure conditions, determines an exposure value (EV), and then proceeds to a step S605. The various exposure conditions set in this step are the shutter control value (Tv value), the aperture control value (Av value), and the gain setting value (ISO sensitivity value).

In the step S605, the camera MPU 101 sends an automatic bounce drive instruction to the strobe device 200 (denoted as ST in FIG. 6) via the strobe controller 118, and proceeds to a step S606. In the step S606, the camera MPU 101 sends the various exposure conditions (Tv, Av, and ISO sensitivity values) calculated in the step S604 to the strobe device 200 via the strobe controller 118, and then proceeds to a step S607.

In the step S607, the camera MPU 101 performs checking of an automatic bounce termination notification from the strobe device 200. More specifically, if a bounce drive termination notification (see a step S1005 in FIG. 10) has been received from the strobe device 200, the camera MPU 101 determines that automatic bounce driving is terminated, and then proceeds to a step S608, whereas if not, the camera MPU 101 continues checking of the automatic bounce termination notification.

In the step S608, if the release switch (SW2) 117b is turned on, the camera MPU 101 proceeds to a step S610, whereas if the release switch (SW2) 117b is in an off-state, the camera MPU 101 proceeds to a step 3609. In the step S609, the camera MPU 101 determines whether or not the release switch (SW1) 117a is still in the on-state, and if the release switch (SW1) 117a is in the on-state, the camera MPU 101 returns to the step S608, whereas if the release switch (SW1) 117a is off, the camera MPU 101 returns to the step S601.

In the step S610, the camera MPU 101 causes the strobe controller 118 to instruct the strobe device 200 to perform preliminary light emission with a predetermined amount of light to thereby cause the light emission section 205 of the strobe device 200 to emit strobe light as preliminary light emission. Then, the camera MPU 101 calculates a light amount for final strobe light emission for exposure, based on the luminance signals acquired by the preliminary light emission, and then proceeds to a step S611.

In the step S611, the camera MPU 101 controls the motor controller 110 to thereby cause the motor, not shown, to perform a mirror-up operation for moving up the mirror, and then proceeds to a step S612. In the step S612, the camera MPU 101 starts charge accumulation in the image pickup device 103, and then proceeds to a step S613. In the step S613, the camera MPU 101 controls the shutter controller 111 to thereby cause a shutter, not shown, which is constituted by the shutter front curtain and the shutter rear curtain, to travel so as to start exposure to the image pickup device 103, and then proceeds to a step S614.

In the step S614, the camera MPU 101 controls the strobe controller 118 to thereby cause the strobe device 200 to perform final light emission with the light amount for final strobe light emission, calculated in the step S610. Then, the camera MPU 101 performs the exposure operation under the various exposure conditions (Tv, Av, and ISO sensitivity values) in synchronism with the final light emission from the strobe device 200, and then proceeds to a step S615.

In the step S615, the camera MPU 101 causes the shutter controller 111 to close the shutter, and then proceeds to a step S616. In the step S616, the camera MPU 101 terminates charge accumulation in the image pickup device 103, and then proceeds to a step S617. In the step S617, the camera MPU 101 causes the motor controller 110 to perform a mirror-down operation for returning the mirror to a position in a shooting optical path, and then proceeds to a step S618.

In the step S618, the camera MPU 101 reads out image signals from the image pickup device 103, and temporarily stores image data which are obtained by performing analog-to-digital conversion on the image signals by the analog-to-digital converter 104, in the buffer memory 106. Then, when all image signals have been read out from the image pickup device 103, the camera MPU 101 performs predetermined development processing on the image signals to thereby generate image data, and then proceeds to a step S619.

In the step S619, the camera MPU 101 records the image data generated in the step S618 in the recording medium 109 as an image file via the recording medium interface 108, and then terminates the series of shooting processing.

Next, a description will be given of the operation of the strobe device 200 with reference to FIGS. 7 to 10. FIG. 7 is a flowchart of a strobe control process for controlling the strobe operation of the strobe device 200. The strobe control process in FIG. 7 is performed by the strobe MPU 204 that executes a program which is stored e.g. in a ROM of the strobe device 200, not shown, and is loaded into a RAM, not shown.

Referring to FIG. 7, in a step S701, the strobe MPU 204 causes the posture detection section 211 to detect a tilt angle γ of the strobe body 201 in the pitch direction and a tilt angle η of the same in the roll direction, and then proceeds to a step S702. Here, the description is continued assuming that the strobe body 201 is not tilted (tilt angle γ=0°, and tilt angle η=0°).

In the step S702, the strobe MPU 204 checks an automatic bounce instruction notification from the camera 10. More specifically, if the strobe MPU 204 has received an automatic bounce instruction notification sent from the camera 10 in the step S605 in FIG. 6, the strobe MPU 204 proceeds to a step S703, whereas if not, the strobe MPU 204 returns to the step S701.

In the step S703, the strobe MPU 204 acquires the various exposure conditions (Tv, Av, and ISO sensitivity values) sent from the camera 10 in the step S606 in FIG. 6, and proceeds to a step S704. In the step S704, the strobe MPU 204 calculates a light amount of final strobe light emission, which is estimated to be applied to shooting, as a GNo value, based on the shutter control value (Tv value) of the exposure conditions acquired in the step S703 and the light emission conditions of the strobe device 200, and then proceeds to a step S705.

The light emission conditions of the strobe device 200 are settings of the strobe device 200 that change the GNo value of the strobe device 200, which affects the exposure in shooting. More specifically, the light emission conditions include the light emission mode (flash light emission or flat light emission), the setting of the zoom position of the light emission section 205 driven by the zoom drive section 206, and so forth. The light emission conditions of the strobe device 200 are set as desired, by a user operation of a photographer, or are automatically set by the camera MPU 101 and the strobe MPU 204 according to the exposure conditions of the camera 10 and the lens focal length.

Here, a description will be given of changes in the GNo value occurring with the light emission mode and the zoom position as the light emission conditions of the strobe device 200, with reference to FIGS. 8A1 to 8B2.

FIG. 8A1 is a graph showing a relationship between a shutter operation and time in a case where the light emission mode is flash light emission, and FIG. 8A2 is a graph showing a relationship between a light emission amount and time in light emission control performed in the case where the light emission mode is flash light emission. FIG. 8B1 is a graph showing a relationship between a shutter operation and time in a case where the light emission mode is flat light emission, and FIG. 8B2 is a graph showing a relationship between a light emission amount and time in light emission control performed in the case where the light emission mode is flat light emission. In FIGS. 8A1 and 8B1, a vertical axis represents a curtain position of each of the shutter front curtain and the shutter rear curtain with respect to the image pickup device 103, and a horizontal axis represents time. FIGS. 8A1 and 8B1 each show how the curtains travel from the upper side to the lower side of the image pickup device 103 in the order of the shutter front curtain and the shutter rear curtain. Further, in FIGS. 8A2 and 8B2, a vertical axis represents an amount of light emitted from the light emission section 205, and a horizontal axis represents time. Note that the shutter front curtain and the shutter rear curtain, shown in FIGS. 8A1 and 8B1, may be a mechanical shutter or may be realized by charge accumulation control of the image pickup device 103, which achieves the same function as the mechanical shutter, i.e. may be an electronic shutter.

First, a description will be given of changes in the GNo value indicative of a light amount for final strobe light emission which is to be irradiated to an object from the strobe device 200 when the camera 10 performs shooting, depending on the light emission mode (flash light emission or flat light emission) and the shutter control value (Tv value) of the exposure conditions.

As shown in FIGS. 8A1 and 8A2, when the light emission mode is flash light emission, the shutter speed (Tv value) for strobe light emission is set to a speed with which light emission from the light emission section 205 can be synchronized (though not indicated in the figures, a value up to e.g. 1/200 or 1/250). In this case, when the shutter front curtain and the shutter rear curtain are fully opened as shown in FIG. 8A1, flash light emission is performed by the light emission section 205, as shown in FIG. 8A2. Thus, when the light emission mode is flash light emission, although the shutter speed is limited, light emission from the light emission section 205 can be performed with the maximum amount of light.

On the other hand, as shown in FIGS. 8B1 and 8B2, when the light emission mode is flat light emission, the shutter speed can be set e.g. to 1/8000, which is higher than the speed of 1/250 with which the light emission from the light emission section 205 can be synchronized. In such a high-speed shutter operation, as shown in FIG. 8B1, the shutter front curtain and the shutter rear curtain are not in a fully opened state, but so-called slit traveling is performed. In this case, if flash light emission shown in FIG. 8A1 is performed, an object is shot in such a manner that an image of the object irradiated with strong light is picked up only in a partial area of the screen of the image pickup device 103, which results in unevenness in brightness of an obtained photograph. To prevent this, as shown in FIG. 8B2, flat light emission is performed, in which light is continuously emitted at a constant brightness from before traveling of the shutter front curtain until completion of traveling of the shutter rear curtain.

In flat light emission, it is necessary to continue light emission with the same light amount during a certain time period from before traveling of the shutter front curtain until after completion of traveling of the shutter rear curtain, and hence compared with flash light emission, the light amount of strobe light emission in shooting is made smaller, even when the same electric energy as in flash light emission is used. Further, as the shutter speed (Tv value) becomes higher with respect to the maximum light amount in flat light emission, a time period over which the image pickup device 103 is exposed becomes shorter, and hence the light amount of flat light emission taken in to form a shot image is also becomes smaller.

For example, in the case of the strobe device 200 having the light emission mode thereof set to flash light emission and the GNo value thereof set to approximately 40, if the light emission mode is changed to flat light emission and the Tv value is set to 1/320 (approximately 3.1 msec), the GNo value is changed to approximately 17.6. Further, in a case where the Tv value is set to 1/8000 (approximately 0.13 msec), the GNo value is changed to approximately 3.5.

Next, a description will be given of changes in the GNo value indicative of the light amount for final strobe light emission which is to be irradiated to an object from the strobe device 200 when the camera 10 performs shooting, depending on the zoom position.

The zoom drive section 206 moves the xenon tube and the reflection umbrella, neither of which is shown, of the light emission section 205 to a predetermined zoom position according to a focal length of the lens. In a zoom position adjusted to a focal length corresponding to a telephoto position of the lens, the irradiation range of the strobe light emission is narrowed, and the GNo value is increased. On the other hand, in a zoom position adjusted to a focal length corresponding to a wide position of the lens, the irradiation range of the strobe light emission is widened, and the GNo value is reduced.

In the step S705, the strobe MPU 204 calculates an optimum shooting distance d at which irradiation light from the light emission section 205 reaches an object, based on the GNo value calculated in the step S704 and the exposure conditions (Av, ISO sensitivity values) notified from the camera 10 in the step S703. The optimum shooting distance d is calculated by using the following equation (1):

$$d = (GNO \times \sqrt{((ISOsensitivity)/100)})/Av \qquad (1)$$

and the strobe MPU 204 temporarily stores the calculated optimum shooting distance d in an internal memory, and proceeds to a step S706:

In the step S706, the strobe MPU 204 determines whether or not the optimum shooting distance d calculated in the step S705 is not larger than a predetermined distance n, and if the shooting distance d is not larger than the predetermined distance n, the strobe MPU 204 proceeds to a step S707, whereas if the shooting distance d is larger than the predetermined distance n, the strobe MPU 204 proceeds to a step S708.

Here, the predetermined distance n is set to a value, such as 0.5 m or 1 m. In a case where the optimum shooting distance d calculated in the step S705 is a small distance not larger than 0.5 m or 1 m, it is determined that there is a high possibility that when bounce shooting toward a ceiling is performed, an irradiation light from the light emission section 205 does not reach the object, which results in a failure photograph. This point will be described hereinafter.

In the step S707, to perform automatic bounce drive control, the strobe MPU 204 sets a horizontal target head angle θX and a vertical target head angle θY as target values of the angle of the strobe head part 203, and proceeds to a step S719. Here, since it is determined in the step S706 that there is a high possibility that the irradiation light does not reach the object in bounce shooting, θX=0° and θY=0° are set to perform strobe shooting in which the light emission section 205 is directed in the front direction of the camera 10 (toward the object). Note that the automatic bounce drive control performed here will be described in detail hereinafter with reference to FIG. 10.

Similarly, in the step S708, to perform the automatic bounce drive control, the strobe MPU 204 sets a horizontal target head angle θX and a vertical target head angle θY as the target values of the angle of the strobe head part 203. Here, bounce driving is performed to measure an object distance, and the light emission section 205 is directed in the front direction of the camera 10 (toward the object), and hence θX=0° and θY=0° are set. Further, the strobe MPU 204 measures an object distance p by the ranging photometry section 207, temporarily stores the result of measurement in the internal memory, and proceeds to a step S709. Note that the automatic bounce drive control performed here will be described in detail hereinafter with reference to FIG. 10.

In the step S709, the strobe MPU 204 compares the optimum shooting distance d calculated in the step S705 and a value obtained by multiplying the object distance p measured in the step S708 by a coefficient, and determines whether or not the following expression (2) is satisfied:

$$\text{optimum shooting distance } d > \mu \times \text{object distance } p \qquad (2)$$

Then, if the above expression (2) is satisfied, the strobe MPU 204 proceeds to the step S710 so as to continue measurement of the distance to the ceiling etc., in the automatic bounce drive control, whereas if the above expression (2) is not satisfied, the strobe MPU 204 proceeds to the step S707 to stop the operation in the automatic bounce drive control.

Here, a description will be given of a reason for performing determination using the coefficient μ in the step S709. The coefficient μ in the above expression (2) is a value which takes into consideration that when performing bounce shooting, strobe light is reflected e.g. by a ceiling, and then irradiated onto an object and hence the optimum shooting distance is necessarily longer than the object distance p, and is set such that the optimum shooting distance d is longer than the object distance p with a margin.

For example, let it be assumed that when bounce shooting is performed, a distance to the ceiling is at least 0.5 m. Further, let it be assumed that the object distance p=1 m is obtained from the result of measurement in the step S708. In this case, a light emission distance S is calculated using the bounce head angle θ calculated in a step S711, by expressions (3) to (5), described hereinafter, which are calculation expressions for the light emission distance S, and as a result of this calculation, the light emission distance S of a main light flux 215 (see FIGS. 9A to 9C) from the light emission section 205 is calculated to be approximately equal to 1.5 m.

Accordingly, for example, assuming that μ=1.5 is set, the light emission distance S can be approximately estimated by multiplying the object distance p=1 m obtained in the step S708 by μ. By determining whether or not the optimum shooting distance d is larger than the light emission distance S approximately estimated using the coefficient μ, it is possible to determine whether or not light can be irradiated onto the object even when taking bounce shooting into account. This makes it possible to determine, in advance, whether or not to perform the automatic bounce drive control in which the distance to the ceiling is measured in the following step S710, whereby it is possible to eliminate an unnecessary bounce operation in the automatic bounce drive control.

Note that when actually performing bounce shooting, the ceiling often exhibits a reflectivity of 60% or 70%, and hence by taking attenuation of light irradiated by bounce light emission into account, the coefficient μ may be set to a value of 2.0 or 2.5.

In the step S710, the strobe MPU 204 performs the automatic bounce drive control for bounce shooting toward the ceiling. That is, in order to measure a distance to the ceiling which is a reflection object in bounce shooting, the strobe MPU 204 performs bounce driving by setting, as targets, the horizontal target head angle θX and the vertical target head angle θY, and then measures the distance to the ceiling.

Therefore, in a case where the camera 10 is not tilted, the strobe device 200 is not tilted, and hence the tilt angles acquired in the step S701 are γ=0° and η=0°, and the target head angles θX and θY in the direction toward the ceiling are θX=0° and θY=90°. Further, the strobe MPU 204 measures a ceiling distance h by the ranging photometry section 207, temporarily stores the measurement result in the internal memory, and then proceeds to the step S711. The automatic bounce drive control performed here will be described in detail hereinafter with reference to FIG. 10.

Here, a description will be given of the horizontal target head angle θX and the vertical target head angle θY, which are set as driving target values when the tilt angles of the strobe body 201 are detected in the step S701.

Let it be assumed that the tilt angle γ of the strobe body 201 in the pitch direction=+10° and the tilt angle 1 of the same in the roll direction=0° are detected in the step S701, and the horizontal head angle θA=180° and the vertical head angle θB=70° are acquired in the step S703. In this case, the strobe MPU 204 sets, as the direction of the ceiling (directly above, in this example), the horizontal target head angle θX=180° and the vertical target head angle θY=(90−10)=80°, according to the tilt angles of the strobe body 201, and performs bounce driving based on the target head angles.

In the step S711, the strobe MPU 204 causes the head angle calculation section 212 to calculate the bounce head angle θ to be set for bounce shooting based on the tilt angles γ and η, the object distance p, and the ceiling distance h, which are obtained in the steps S701, 3708, and S710. Then, the strobe MPU 204 temporarily stores the calculated bounce head angle θ in the internal memory, and then proceeds to a step S712.

Here, a description will be given of an example of calculation of the bounce head angle θ as the tilt angle of the strobe head part 203 in a bounce shooting scene with reference to FIGS. 9A to 9C.

Figure 9A:
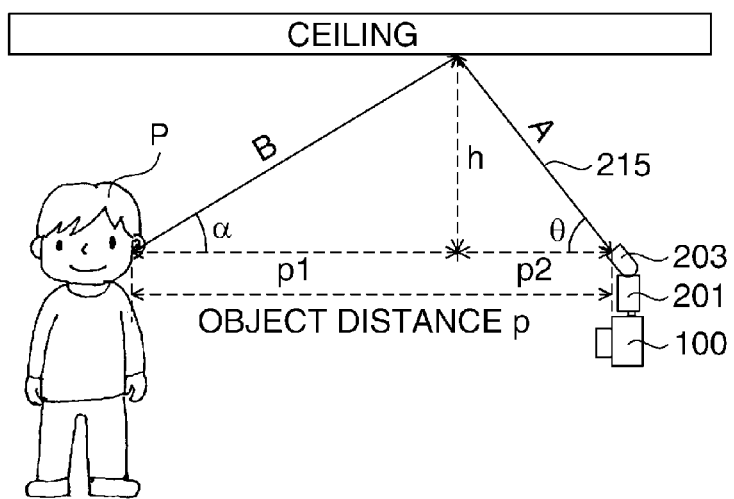
FIGS. 9A to 9C are diagrams useful in explaining an example of calculation of a bounce head angle which is a tilt angle of the strobe head part in a bounce shooting scene.
Figure 9B:
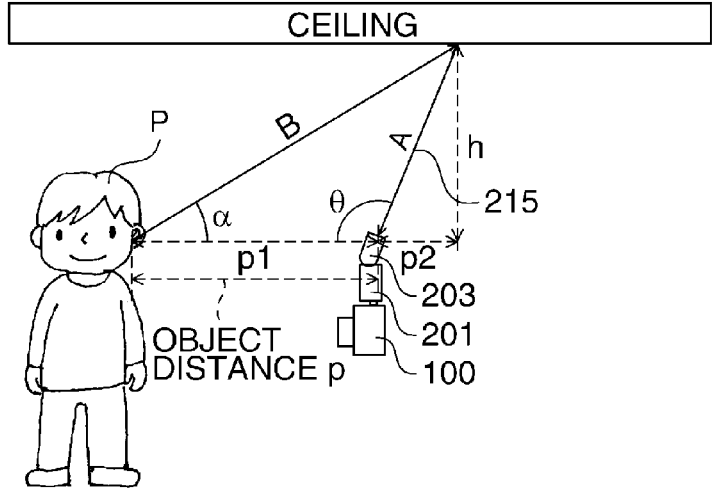
Figure 9C:
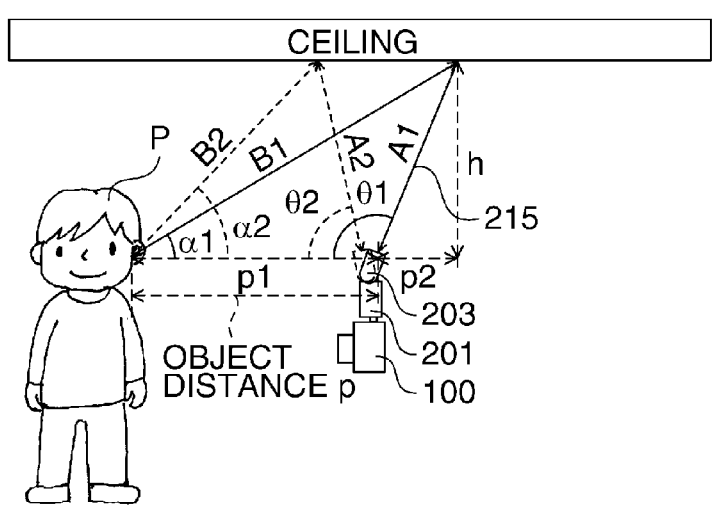

Referring to FIGS. 9A to 9C, an object distance from a strobe light emission surface of the light emission section 205 of the strobe head part 203 to an object P is represented by p, and a distance to the ceiling is represented by h. Further, a distance to the object P from an intersection point of a horizontal line connecting between the strobe light emission surface of the light emission section 205 and the object P and a vertical line from a reflection point of the ceiling which is irradiated by the main light flux 215 and reflects the strobe light, is represented by p1, and a distance from the above-mentioned intersection point to the strobe light emission surface of the light emission section 205 is represented by p2.

The bounce head angle θ is an angle formed by the main light flux 215 of light emitted from the light emission section 205 with reference to the direction of the light emission section 205 which is directed to the front side (toward the object) in the optical axis direction. In the present example, the strobe body 201 is assumed to be not tilted, and hence γ=0° and η=0°, so that the horizontal target head angle θX and the vertical target head angle θY, described hereinafter, are set as θX=0° and θY=θ, respectively.

Then, when an angle formed by the main light flux 215 that is reflected by the ceiling and enters the object P with reference to the direction of the light emission section 205 which is directed to the front side (toward the object) in the optical axis direction is set as an object entering angle α, the distance p2 can be calculated by the following equation (3):

$$p2 = p - (h/\tan \alpha) \quad (3)$$

Further, from the above equation (3), the bounce head angle θ can be calculated by the following equation (4):

$$\theta = \tan^{-1}(h \tan \alpha / (p \tan \alpha - h)) \quad (4)$$

From the above equation (4), the bounce head angle θ for realizing the object entering angle α is determined. Here, the object entering angle α is a constant set in advance, and hence by detecting the object distance p and the ceiling distance h using the ranging photometry section 207 in a step S1004 in FIG. 10, described hereinafter, the bounce head angle θ can be calculated. For example, in a case where the object entering angle α=300, the object distance p=3 m, and the ceiling distance h=1.5 m are acquired, the bounce head angle θ becomes equal to approximately 75°.

FIG. 9B shows a case where shooting is performed when the object P and the photographer are within a relatively short distance. In this case, assuming that the object entering angle α=30°, the object distance p=2 m, and the ceiling distance h=1.5 m are acquired, the above equation (3) results in a minus value, and θ of the left side of the above equation (4) becomes equal to (180°+θ), and the bounce head angle θ becomes equal to approximately 112°.

Note that in the step S711, as shown in FIGS. 9A to 9C, the bounce head angle θ is calculated assuming that the object P is a person, and by setting the object entering angle α at which the reflected light of strobe light emission enters the object P, to the optimum angle of 30°. This is because if the object entering angle α is set to a larger value, such as 60° or 70°, light irradiates the person from substantially directly above the person, which may generate a shadow of hair or a jaw of the person. Therefore, provided that it is known e.g. by image recognition that the object is not a person, the object entering angle α may be set to a value other than 30°.

In the step S712, the strobe MPU 204 determines whether or not a relationship between the bounce head angle θ calculated in the step S711 and a predetermined angle τ satisfies the following expression (5):

$$\theta > \tau \quad (5)$$

Then, if the above expression (5) is satisfied, the strobe MPU 204 proceeds to a step S713, whereas if not, the strobe MPU 204 proceeds to the step S707. If the bounce head angle θ is not larger than the angle τ, emitted light of strobe light emission directly enters the field of shooting, which generates an unnatural photograph in which only the upper part of the field is bright, and hence the determination in this step is performed to prevent this undesired result.

Therefore, in a case of a condition (θ≤τ) in which the emitted light may directly enter the field, the strobe head part 203 is driven to direct the irradiation direction of light from the light emission section 205 to the front side of the shooting optical axis without performing bounce shooting. Further, although the angle τ is set by taking into account the angle of view of the lens and a light distribution angle of light emitted from the strobe, it is desirable to set the angle τ to a value of 40° or 45°, with a sufficient margin.

In the step S713, the strobe MPU 204 calculates the light emission distance S, based on the object distance p and the ceiling distance h, detected in the steps S708 and S710, respectively, the bounce head angle θ calculated by the above equations (3) and (4), and the object entering angle α set in advance. Then, the strobe MPU 204 temporarily stores the calculated light emission distance S in the internal memory, and then proceeds to a step S714.

Here, an example of calculation of the light emission distance S will be described with reference to FIG. 9A. As shown in FIG. 9A, a distance from the light emission section 205 of the strobe head part 203 to the reflection surface of the ceiling where the main light flux 215 of light emitted from the light emission section 205 is reflected is represented by A, and a distance from the reflection surface of the ceiling to the object P is represented by B. The distances A and B are determined by the following equations (6) and (7), respectively, and the light emission distance S is determined by the following equation (8):

$$A = h/\sin\theta \quad (6)$$

$$B = h/\sin\alpha \quad (7)$$

$$S = A + B \quad (8)$$

For example, in the case of FIG. 9A, when the bounce head angle θ calculated in the step S711 based on the object entering angle α=30° and the ceiling distance h=1.5 m is equal to approximately 75°, A=1.55 m and B=3 m are calculated, whereby S=4.55 m is calculated.

In the step S714, the strobe MPU 204 determines whether or not a relationship between the optimum shooting distance d calculated in the step S705 and a value obtained by multiplying the light emission distance S calculated in the step S713 by a coefficient ω satisfies the following expression (9):

$$\text{optimum shooting distance } d > \text{light emission distance } S \times \omega \quad (9)$$

Then, if the above expression (9) is satisfied, the strobe MPU 204 judges that it is possible to perform bounce shooting at the bounce head angle θ calculated in the step S711, and then proceeds to a step S715. On the other hand, if the above expression (9) is not satisfied, the strobe MPU 204 judges that the bounce head angle θ makes the light amount insufficient in bounce shooting, and then proceeds to a step S716.

Here, the coefficient ω in the above expression (9) is a value set such that the optimum shooting distance d is made longer than the light emission distance S with a predetermined margin, by taking into account a loss of light due to reflection from the ceiling in bounce shooting. For example, when performing bounce shooting, assuming that the reflectivity of the ceiling is at least 50%, the coefficient ω is set to ω=2 (=1/0.5). As a result, it is possible to determine in the step S714 whether or not the optimum shooting distance d has a margin with respect to the light emission distance S in actual bounce shooting. This makes it possible to perform optimum strobe shooting while preventing a photograph not intended by a photographer from being obtained due to insufficient light amount of strobe light emission irradiated onto an object in bounce shooting.

In the step S715, the strobe MPU 204 performs the automatic bounce drive control based on the horizontal target head angle θX and the vertical target head angle θY so as to drive the strobe head part 203 to the bounce head angle θ calculated in the steps S711 and so forth. Then, the strobe MPU 204 proceeds to the step S719 after termination of bounce driving. Note that the automatic bounce drive control performed in this step will be described in detail hereinafter with reference to FIG. 10.

In the step S716, the strobe MPU 204 sets the object entering angle α set in the step S711 to α=α+1 to thereby add 1° to the object entering angle α, and then proceeds to a step 717.

In the step S717, the strobe MPU 204 determines whether or not a relationship between the object entering angle α and a predetermined angle ζ satisfies a α≤ζ. Then, if α≤ζ is satisfied, the strobe MPU 204 proceeds to a step S718, whereas if not, the strobe MPU 204 proceeds to the step S707. The angle ζ used in this step is desired to be set such that an object is prevented from being irradiated with light of strobe light emission from substantially directly above the object to generate a shadow.

For example, as shown in FIGS. 9A to 9C, when the object P is a person, the angle ζ is set to an angle of 40° or 45°. In a case where it is known by image recognition or a face recognition function that the object is not a person and a shadow is less likely to be generated, the angle ζ may be set to a different angle, such as 50° or 60°.

In the step S718, similar to the step S711, the strobe MPU 204 calculates the bounce head angle θ again using the above equation (4) based on the new object entering angle α, and returns to the step S712.

In the above-described steps S716 to S718, the object entering angle α=30° set in the step S711 as the optimum object entering angle α is changed to be increased within a range in which shooting is not largely affected, whereby the light emission distance S to be calculated in the step S713 executed thereafter is made smaller.

Here, a description will be given of reduction of the light emission distance S due to a change of the object entering angle α, with reference to FIG. 9C. Let it be assumed that FIG. 9C shows a case of an object entering angle α1=30°, the object distance p=3 m, and the ceiling distance h=2 m, by way of example. In this case, from the above equation (4), a bounce head part angle θ1 becomes equal to approximately 103°. This is a condition, as shown in FIG. 9C, in which the irradiation direction of the strobe head part 203 is changed to a direction toward the rear side of the camera 10. The light emission distance S in this case becomes equal to approximately 6.1 m from the above equations (6), (7), and (8).

Further, assuming that the object entering angle is α2=40° under the same condition, a bounce head part angle θ2 becomes equal to approximately 73° from the above equation (4). This is a condition, as shown in FIG. 9C, in which the irradiation direction of the strobe head part 203 is changed to a direction toward the front side of the camera 10. The light emission distance S in this case becomes equal to approximately 5.2 m similarly from the above equations (6), (7), and (8).

Then, in the step S714, assuming that ω=2 is set in the above expression (9), the optimum shooting distance d necessary for the above respective conditions is determined as d>12.2 m for the object entering angle α1=30°, and d>10.4 m for the object entering angle α2=40θ. As a result, by changing the object entering angle α, it is possible to ensure a margin of approximately 2 m with respect to the optimum shooting distance d. Therefore, in a condition in which the optimum shooting distance d calculated in the step S705 is equal to 11 m, it is possible to determine the irradiation direction such that light of strobe light emission reaches the object in bounce shooting.

By determining the irradiation direction as described above, even in a state in which light is not to reach an object in bounce shooting, the object entering angle α is changed to reduce the light emission distance S, whereby it is possible to make the light reach the object, which makes it possible to perform the optimum strobe shooting.

In the step S719, the strobe MPU 204 checks a light emission instruction notification sent from the camera CPU 101 in the steps S610 and S614 in FIG. 6. More specifically, if the light emission pattern (preliminary light emission instruction or final light emission instruction) and a predetermined amount of light emission, which have been sent from the camera MPU 101, are acquired, the strobe MPU 204 proceeds to a step S720, whereas if not, the strobe MPU 204 continues checking of a light emission instruction notification.

In the step S720, the strobe MPU 204 performs light emission control based on the light emission pattern (preliminary light emission instruction or final light emission instruction) and the predetermined amount of light emission, sent from the camera MPU 101, and then proceeds to a step S721.

In the step S721, if the light emission pattern acquired from the camera 10 in the step S719 is preliminary light emission, the strobe MPU 204 returns to the step S719 to perform final light emission control subsequently, whereas if the acquired light emission pattern is final light emission, the strobe MPU 204 terminates the strobe control process.

Note that in the present embodiment, the description is given of the case where the strobe body 201 is not tilted in the steps S710 to S718. However, in actuality, similar to the step S710, the bounce head part angle θ, and the horizontal target head angle θX and the vertical target head angle θY for realizing the bounce head part angle θ are set based on the tilt angles γ and η of the strobe body 201, obtained in the step S701.

Next, a description will be given of an automatic bounce drive control process performed in the steps S707, S708, S710, and S715 in FIG. 7 with reference to FIG. 10.

Figure 10:
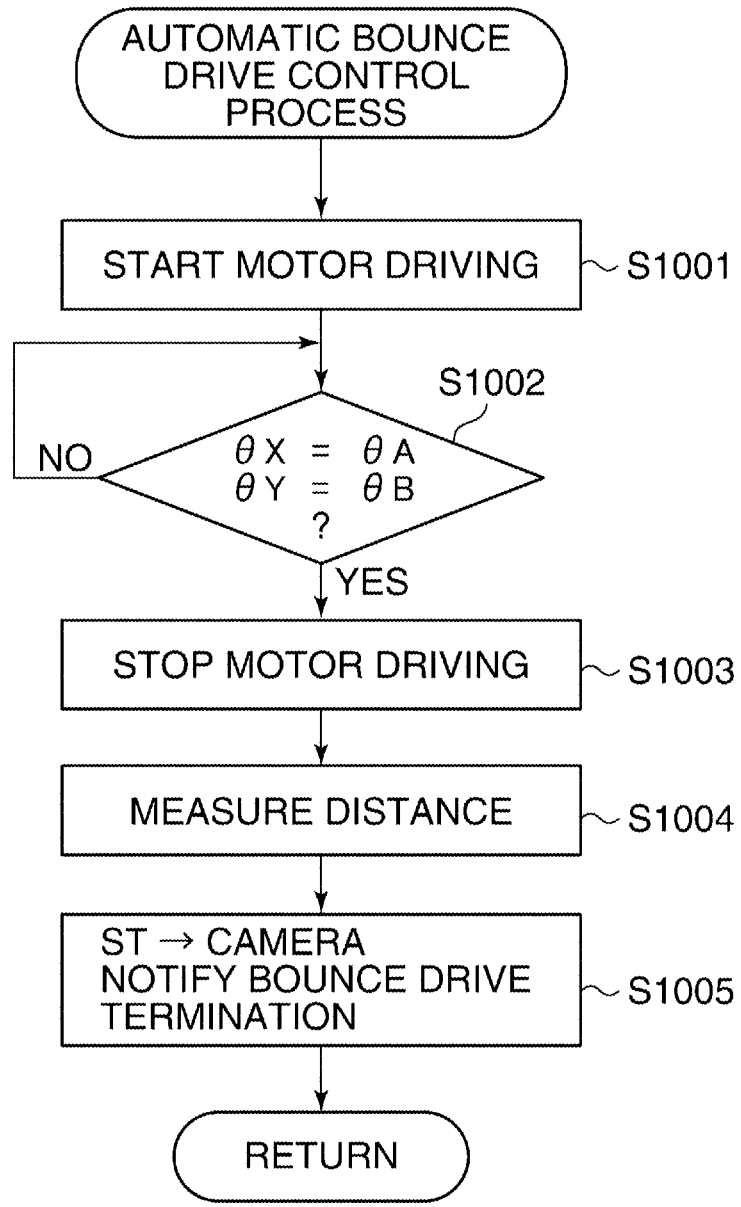
FIG. 10 is a flowchart of an automatic bounce drive control process performed in corresponding steps in FIG. 7.

Referring to FIG. 10, in a step S1001, the strobe MPU 204 causes the bounce drive controller 209 to control the motor to start driving of the strobe head part 203, and then proceeds to a step S1002.

In the step S1002, the strobe MPU 204 acquires the horizontal head angle θA and the vertical head angle θB of the current strobe head position from the head angle detection section 208. Then, the strobe MPU 204 checks whether or not the acquired current head angles θA and θB are equal to the horizontal target head angle θX and the vertical target head angle θY, respectively. As a result of the check, if the horizontal target head angle θX and the vertical target head angle θY are equal to the head angles θA and θB, respectively (θX=θA, θY=θB), the strobe MPU 204 proceeds to a step S1003, whereas if not, the strobe MPU 204 continues checking of whether or not the current head angles are equal to the target angles.

Here, in the step S710 in FIG. 7, the horizontal target head angle θX and the vertical target head angle θY are values set so as to drive the strobe head part 203 in the direction toward the ceiling. Further, similarly, in the steps S707 and S708 in FIG. 7, the horizontal target head angle θX and the vertical target head angle θY are values set to θX=0° and θY=0° so to drive the strobe head part 203 in the front direction of the camera 10. Further, similarly, in the steps S711 and S718, the horizontal target head angle θX and the vertical target head angle θY are values which are calculated in the steps S711 and S718 as the bounce head angle θ and set according to the tilt angles γ and η acquired in the step S701.

In the step S1003, the strobe MPU 204 controls the bounce drive controller 209 to cause the motor to stop driving of the strobe head part 203, and proceeds to the step S1004.

In the step S1004, the strobe MPU 204 causes the ranging photometry section 207 to measure the distance to the ceiling in the step S710 in FIG. 7, and the distance to the object in the step S708 in FIG. 7, and then proceeds to the step S1005.

Although when the ranging photometry section 207 measures a distance, various methods, such as a triangulation ranging method and a laser distance measurement method, may be used, in the present example, a distance is measured based on an amount of light which is emitted as strobe light and reflected by a reflection object. More specifically, strobe light which is emitted from the light emission section 205 as preliminary light emission of the strobe device 200 is reflected by an object, and the reflected light is received by the ranging photometry section 207, and is output to the strobe MPU 204 as a luminance signal. The strobe MPU 204 converts the luminance signal received from the ranging photometry section 207 from analog to digital using the analog-to-digital converter, not shown, calculates a distance corresponding to the converted amount, and temporarily stores the calculated distance in the internal memory of the strobe MPU 204. Note that this measurement of a distance is executed by performing communication only in the steps S708 and S710 in FIG. 7.

In the step S1005, the strobe MPU 204 notifies the camera 10 of termination of bounce driving via the camera connection section 210, followed by terminating the present process. Note that this notification is sent in the steps S707 and S715 in FIG. 7.

As described above, in the present embodiment, in the automatic bounce drive control in bounce shooting, the optimum shooting distance d for strobe light emission and the light emission distance S in bounce shooting are calculated based on the exposure conditions and the light emission conditions, and the irradiation direction of the strobe light is determined. As a result, even in a case where strobe light is not to reach an object, by changing the bounce angle so as to reduce the light emission distance S, or by changing the strobe light emission to direct light emission toward the front side, it is possible to perform optimum strobe shooting while preventing strobe shooing in which light does not reach the object.

Further, in the present embodiment, in a case where light is not to reach an object in bounce shooting, the irradiation direction is determined according to the set exposure conditions and the light emission conditions without performing an unnecessary operation of the automatic bounce drive control. This makes it possible to reduce the operation time in the automatic bounce driving, and perform the optimum strobe shooting.

In the present embodiment, calculations of the optimum shooting distance d, the bounce head angle θ, and the light emission distance S are performed by the strobe MPU 204 based on posture detection by the strobe device 200, the data acquired by the ranging photometry section 207, and the exposure conditions received from the camera 10. However, this is not limitative. That is, the optimum shooting distance d and so forth may be calculated by the camera MPU 101 based on the exposure conditions, the object distance, and so forth, which are acquired by the photometry section 112, the lens controller 114, the posture detection 116, and so forth, the GNo value and the ceiling distance received by the camera 10 from the strobe device 200.

Further, in the present embodiment, the strobe MPU 204 of the strobe device 200 performs the automatic bounce drive control, and instructs driving of the head part to the target head angle. However, the camera 10 may perform the automatic bounce drive control and instruct driving of the head part to a predetermined target head angle while communicating with the strobe device 200.

Next, a description will be given of an image pickup system according to a second embodiment of the present invention with reference to FIGS. 11 and 12. Components corresponding to those of the first embodiment are denoted by the same reference numerals, and description thereof is omitted.

Figure 11:
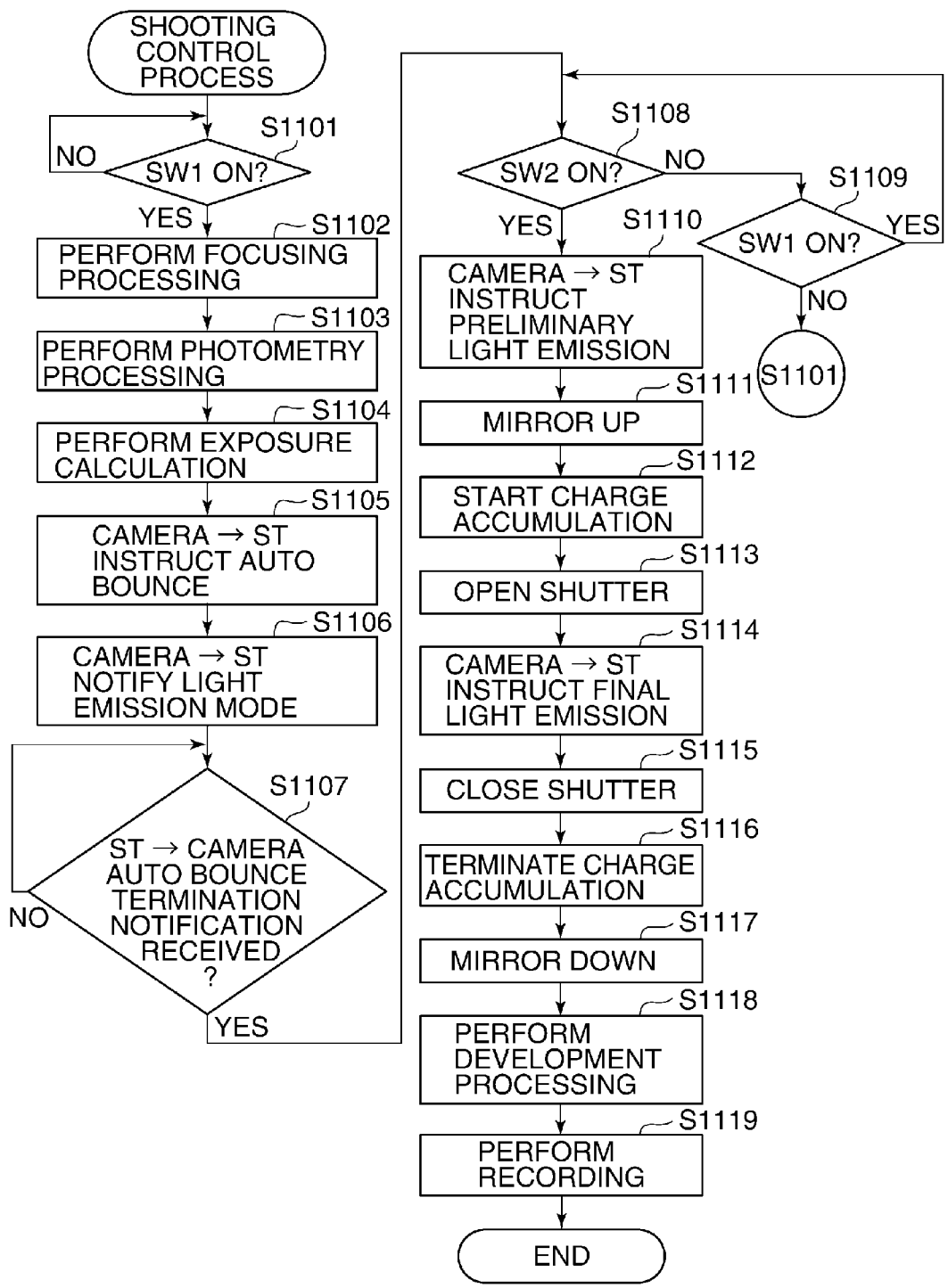
FIG. 11 is a flowchart of a shooting control process for controlling shooting performed by a digital camera of an image pickup system according to a second embodiment of the present invention.

FIG. 11 is a flowchart of a shooting control process for controlling shooting performed by the digital camera 10 of the image pickup system according to the second embodiment. The shooting control process in FIG. 11 is performed by the camera MPU 101 that executes a program stored e.g. in the ROM of the camera body 100 and loaded into the RAM. Steps S1101 to S1105, and S1107 to S1119 in FIG. 11 are the same as the steps S601 to S605, and S607 to S619 in FIG. 6, respectively, and hence description thereof is omitted. That is, in the present embodiment, a step S1106 in FIG. 11 differs from the step S606 in FIG. 6, and hence the description is given only of the step S1106.

In the step S1106, the camera MPU 101 notifies the strobe device 200 of the light emission mode set by the camera 10 via the strobe controller 118 and the external strobe connection section 120, and proceeds to the step S1107.

The light emission mode notified in this step is, as already described with reference to FIGS. 9A to 9C, the flash light emission or the flat light emission, and is determined by a photographer who selects the light emission mode on the camera 10. Further, the light emission mode may be automatically set to the flat light emission in a case where the Tv value is higher than $1/200$ or $1/250$ according to the exposure conditions set by the photographer on the camera 10 or the exposure conditions calculated in the step S1104. Note that shooting in which flat light emission is performed at a high shutter speed is referred to as so-called high-speed synchronization shooting.

Figure 12:
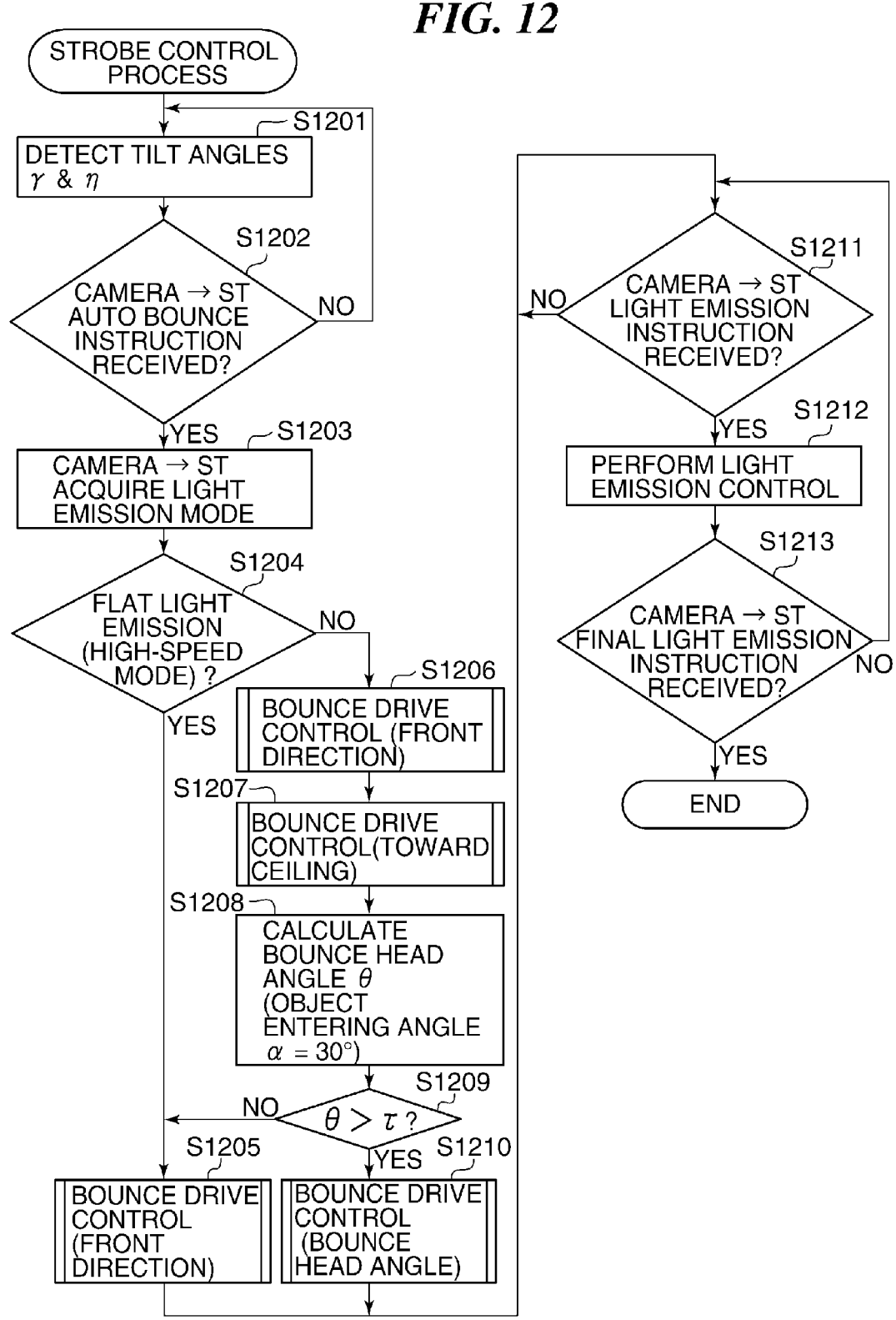
FIG. 12 is a flowchart of a strobe control process for controlling the strobe operation of the strobe device.

FIG. 12 is a flowchart of a strobe control process for controlling the strobe operation of the strobe device 200. The strobe control process in FIG. 12 is performed by the strobe MPU 204 that executes a program stored e.g. in the ROM of the strobe device 200 and loaded into the RAM. Steps S1201, S1202, and S1205 to S1213 in FIG. 12 are the same as the steps S701, S702, S707, S708, S710 to S712, S715, and S719 to S721 in FIG. 7, respectively, and hence the description is given only of different points.

In a step S1203, the strobe MPU 204 acquires an instruction notification from the camera 10, indicative of flash light emission or flat light emission as the light emission mode, and proceeds to a step S1204.

In the step S1204, the strobe MPU 204 determines whether or not the light emission mode acquired in the step S1203 is flat light emission, and if the light emission mode is flat light emission, the strobe MPU 204 proceeds to the step S1205, whereas if not, the strobe MPU 204 proceeds to a step S1206.

Here, through determination of whether or not the light emission mode is flat light emission, if the light emission mode is flat light emission, there is a high possibility that irradiated light of strobe light emission does not reach an object in bounce shooting, and hence the strobe MPU 204 proceeds to the step S1205 without measuring an object distance and a ceiling distance in the automatic bounce drive control. In the step S1205, bounce driving toward the front side is performed similarly to the step S707 in FIG. 7. On the other hand, if the light emission mode is not flat light emission, bounce shooting is to be performed with normal flash light emission, and hence the strobe MPU 204 proceeds to the step S1206, wherein an object distance and a ceiling distance are measured, and the optimum driving of the bounce head part 203 in bounce shooting is performed.

As described above, in the present embodiment, whether or not to perform the automatic bounce drive control is determined based on the light emission mode of the flash light emission or the flat light emission as one of the light emission conditions, and the irradiation direction of the strobe light emission is determined according to whether shooting with direct strobe light emission toward the front side or bounce shooting is to be performed. As a result, in a case where there is a high possibility that strobe light does not reach an object, the light emission is changed to direct strobe light emission toward the front side, whereby it is possible to perform the optimum strobe shooting while preventing strobe shooting in which light does not reach the object.

Further, in a case where there is a high possibility that light does not reach an object in bounce shooting depending on the setting of flash light emission or flat light emission, the irradiation direction of the strobe light emission is determined without performing an unnecessary operation of the automatic bounce drive control. This makes it possible to provide optimum strobe shooting while reducing the operation time in automatic bounce driving.

Note that in the present embodiment, whether or not to perform the automatic bounce drive control is determined based on the light emission mode which is flat light emission or flash light emission. However, whether or not there is a possibility that strobe light does not reach an object in bounce shooting may be determined based on another light emission condition. For example, by calculating a GNo value based on the condition of whether the light emission mode is flash light emission or flat light emission, the shutter speed (Tv value), and the zoom position of the strobe device 200, whether or not to perform the automatic bounce drive control may be determined according to the GNo value. The other configurations and advantageous effects are the same as those provided by the first embodiment.

While the present invention has been described with reference to exemplary embodiments, it is to be understood that the invention is not limited to the disclosed exemplary embodiments.

For example, in the above-described embodiments, the description is given of the example using the strobe device 200 in which the strobe head part 203 including the light emission section 205 is supported by the strobe body 201 via the bounce mechanism section 202 in such a manner that its angle is adjustable. However, if the camera has the configuration that the built-in strobe device 119 is supported by the camera body 100 in such a manner that its angle is adjustable, the control of the above-described two embodiments may be applied to the control of the built-in strobe device 119. Alternatively, the built-in strobe device 119 and the strobe device 200 may be configured to change the direction of the light source and the reflection umbrella to thereby change the irradiation direction of light.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-075087 filed Apr. 4, 2016, which is hereby incorporated by reference herein in its entirety.

What is claimed is:

1. An image pickup system including an image pickup apparatus, and a light emission device that is incorporated or removably mounted on the image pickup apparatus and is capable of communicating with the image pickup apparatus, the light emission device including a light emission section that emits light, and a drive unit configured to change an irradiation direction of light emitted from the light emission section, the image pickup system comprising:
an exposure condition-setting unit configured to set exposure conditions which are set to the image pickup apparatus;
a determination unit configured to determine the irradiation direction of light emitted from the light emission section which is to be changed by said drive unit; and
a light emission condition-setting unit configured to set light emission conditions which are set to the light emission device according to the exposure conditions,
wherein said determination unit determines the irradiation direction of light emitted from the light emission section, based on the exposure conditions set by said exposure condition-setting unit, and the light emission conditions set by said light emission condition-setting unit.

2. The image pickup system according to claim 1, wherein the exposure conditions are at least a shutter control value, an aperture control value, and a gain setting value.

3. The image pickup system according to claim 1, wherein the light emission section can be driven by zoom driving, and the light emission conditions are at least a light emission mode and a zoom position of the light emission section.

4. The image pickup system according to claim 1, wherein the light emission device includes a measurement unit configured to measure an object distance between an object to be shot by the image pickup apparatus and the light emission device, and a ceiling distance between a ceiling and the light emission device, and
wherein said determination unit determines the irradiation direction of light emitted from the light emission section, based on results of measurement of the object distance and the ceiling distance, obtained by said measurement unit.

5. The image pickup system according to claim 4, wherein said measurement unit is provided in the light emission section.

6. The image pickup system according to claim 4, wherein the light emission device includes a shooting distance calculation unit configured to calculate a shooting distance corresponding to an amount of light emitted from the light emission section, based on the exposure conditions, and a light emission distance calculation unit configured to calculate a distance from the light emission section to an object irradiated with light emitted therefrom, based on the object distance and the ceiling distance, which are measured by said measurement unit, and
wherein said determination unit determines the irradiation direction of light emitted from the light emission section such that the shooting distance calculated by said shooting distance calculation unit is larger than the light emission distance calculated by said light emission distance calculation unit.

7. The image pickup system according to claim 6, further comprising a judgment unit configured to judge whether or not to measure the distance by said measurement unit based on the shooting distance calculated by said shooting distance calculation unit.

8. The image pickup system according to claim 6, further comprising a second determination unit configured to determine whether or not to measure the ceiling distance by said measurement unit based on the shooting distance and the object distance.

9. An image pickup system including an image pickup apparatus, and a light emission device that is incorporated or removably mounted on the image pickup apparatus, and is capable of communicating with the image pickup apparatus, the light emission device including a light emission section that emits light, and a drive unit configured to change an irradiation direction of light emitted from the light emission section, the image pickup system comprising:
a determination unit configured to determine the irradiation direction of light emitted from the light emission section which is to be changed by said drive unit; and
a light emission condition-setting unit configured to set flash light emission or flat light emission as a light emission condition of the light emission device, according to selection by a user operation on the image pickup apparatus,
wherein said determination unit determines the irradiation direction of light emitted from the light emission section based on the light emission condition set by said light emission condition-setting unit.

10. A light emission device including a light emission section that emits light, and a drive unit configured to change an irradiation direction of light emitted from the light emission section, the light emission device being incorporated or removably mounted on an image pickup apparatus and being capable of communicating with the image pickup apparatus, the light emission device comprising:
an acquisition unit configured to acquire exposure conditions set by the image pickup apparatus;
a determination unit configured to determine the irradiation direction of light emitted from the light emission section which is to be changed by said drive unit; and
a light emission condition-setting unit configured to set light emission conditions according to the exposure conditions,
wherein said determination unit determines the irradiation direction of light emitted from the light emission section, based on the exposure conditions acquired by said acquisition unit and the light emission conditions set by said light emission condition-setting unit.

11. A light emission control method for a light emission device that includes a light emission section that emits light, and a drive unit configured to change an irradiation direction of light emitted from the light emission section, and is incorporated or removably mounted on an image pickup apparatus and capable of communicating with the image pickup apparatus, the method comprising:
acquiring exposure conditions set by the image pickup apparatus;
determining the irradiation direction of light emitted from the light emission section which is to be changed by the drive unit; and
setting light emission conditions according to the exposure conditions,
wherein said determining includes determining the irradiation direction of light emitted from the light emission section based on the exposure conditions acquired by said acquiring and the light emission conditions set by said setting.

12. A non-transitory computer-readable storage medium storing a computer-executable program for executing a light emission control method for a light emission device that includes a light emission section that emits light, and a drive unit configured to change an irradiation direction of light emitted from the light emission section, and is incorporated or removably mounted on an image pickup apparatus and capable of communicating with the image pickup apparatus,
wherein the method comprises:
acquiring exposure conditions set by the image pickup apparatus;
determining the irradiation direction of light emitted from the light emission section which is to be changed by the drive unit; and
setting light emission conditions according to the exposure conditions,
wherein said determining includes determining the irradiation direction of light emitted from the light emission section based on the exposure conditions acquired by said acquiring and the light emission conditions set by said setting.

\* \* \* \* \*